United States Patent
Chun et al.

(10) Patent No.: US 11,095,417 B2
(45) Date of Patent: *Aug. 17, 2021

(54) METHOD FOR TRANSMITTING DATA IN WIRELESS COMMUNICATION SYSTEM AND APPARATUS THEREFOR

(71) Applicant: LG ELECTRONICS INC., Seoul (KR)

(72) Inventors: Jinyoung Chun, Seoul (KR); Kiseon Ryu, Seoul (KR); Jeongki Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,793

(22) Filed: Jan. 9, 2020

(65) Prior Publication Data
US 2020/0153596 A1    May 14, 2020

Related U.S. Application Data

(63) Continuation of application No. 15/745,663, filed as application No. PCT/KR2016/000805 on Jan. 26, 2016, now Pat. No. 10,560,242.
(Continued)

(51) Int. Cl.
*H04L 5/00* (2006.01)
*H04W 84/12* (2009.01)
(Continued)

(52) U.S. Cl.
CPC .......... *H04L 5/0055* (2013.01); *H04L 1/1685* (2013.01); *H04L 27/26* (2013.01); *H04L 69/22* (2013.01); *H04W 84/12* (2013.01)

(58) Field of Classification Search
CPC ..... H04W 84/12; H04W 28/04; H04W 28/06; H04L 27/26; H04L 5/0055; H04L 69/22; H04L 1/16; H04L 1/1685
See application file for complete search history.

(56) References Cited

U.S. PATENT DOCUMENTS

2005/0135284 A1* 6/2005 Nanda ................ H04L 29/06
                                                                370/294
2010/0220678 A1* 9/2010 Wentink ............. H04L 1/1685
                                                                370/329
(Continued)

OTHER PUBLICATIONS

European Patent Office Application Serial No. 16844533.6, Search Report dated Mar. 20, 2019, 10 pages.
(Continued)

*Primary Examiner* — Rina C Pancholi
(74) *Attorney, Agent, or Firm* — Lee Hong Degerman Kang Waimey

(57) ABSTRACT

A method for performing an uplink (UL) multi-user (MU) transmission performed by a station (STA) device in a Wireless LAN (WLAN) system according to an embodiment of the present invention may include receiving a Downlink (DL) MU Physical Protocol Data Unit (PPDU) including a physical preamble and a data field; and where the data field includes at least one Mac Protocol Data Unit (MPDU), where the at least one MPDU includes a trigger frame or a MAC header, where the trigger frame or the MAC header includes trigger information for a UL MU transmission of an ACK (Acknowledge) frame, and performing a UL MU transmission of the ACK frame in response to the DL MU PPDU based on the trigger information.

18 Claims, 17 Drawing Sheets

Related U.S. Application Data

(60) Provisional application No. 62/236,155, filed on Oct. 2, 2015, provisional application No. 62/215,684, filed on Sep. 8, 2015.

(51) Int. Cl.
*H04L 27/26* (2006.01)
*H04L 1/16* (2006.01)
*H04L 29/06* (2006.01)

(56) References Cited

U.S. PATENT DOCUMENTS

| | | | | |
|---|---|---|---|---|
| 2014/0307653 | A1* | 10/2014 | Liu | H04W 74/006 370/329 |
| 2015/0124689 | A1* | 5/2015 | Merlin | H04L 1/009 370/312 |
| 2015/0124690 | A1* | 5/2015 | Merlin | H04W 72/005 370/312 |
| 2016/0014805 | A1* | 1/2016 | Merlin | H04W 56/0005 370/345 |
| 2016/0043855 | A1* | 2/2016 | Seok | H04L 1/0033 370/330 |
| 2016/0087775 | A1* | 3/2016 | Hedayat | H04L 1/12 370/329 |
| 2016/0360509 | A1* | 12/2016 | Seok | H04L 1/1685 |
| 2017/0331736 | A1* | 11/2017 | Seok | H04L 45/74 |
| 2018/0212738 | A1 | 7/2018 | Chun et al. | |

OTHER PUBLICATIONS

Hedayat, R. et al., "Uplink ACK and BA Multiplexing", doc.: IEEE 802.11-15/829r3, XP068119969, Jul. 2015, 22 pages.

PCT International Application No. PCT/KR2016/000805, Written Opinion of the International Searching Authority dated Jun. 8, 2016, 12 pages.

Syed,"Very High Throughput (VHT) Multi-User Multiple Input Multiple Output (MU-MIMO) Communication in 802.11ac", Research Project Submitted in Partial Fulfillment of the Requirements for the Degree of Master of Engineering in the School of Engineering Science, Faculty of Applied Sciences, 2015, 58 pages.

United States Patent and Trademark Office U.S. Appl. No. 15/745,663, Office Action dated Apr. 18, 2019, 21 pages.

Japan Patent Office Application No. 2017-558670, Office Action dated Jun. 25, 2019, 2 pages.

Asterjadhi, et al., "HE A-Control Field", IEEE 802.11-15/1121r0, Sep. 12, 2015, 18 pages.

Ryu, et al., "UL MU Procedure", IEEE 802.11-15/0365r0, Mar. 9, 2015, 16 pages.

* cited by examiner

[FIG. 1]
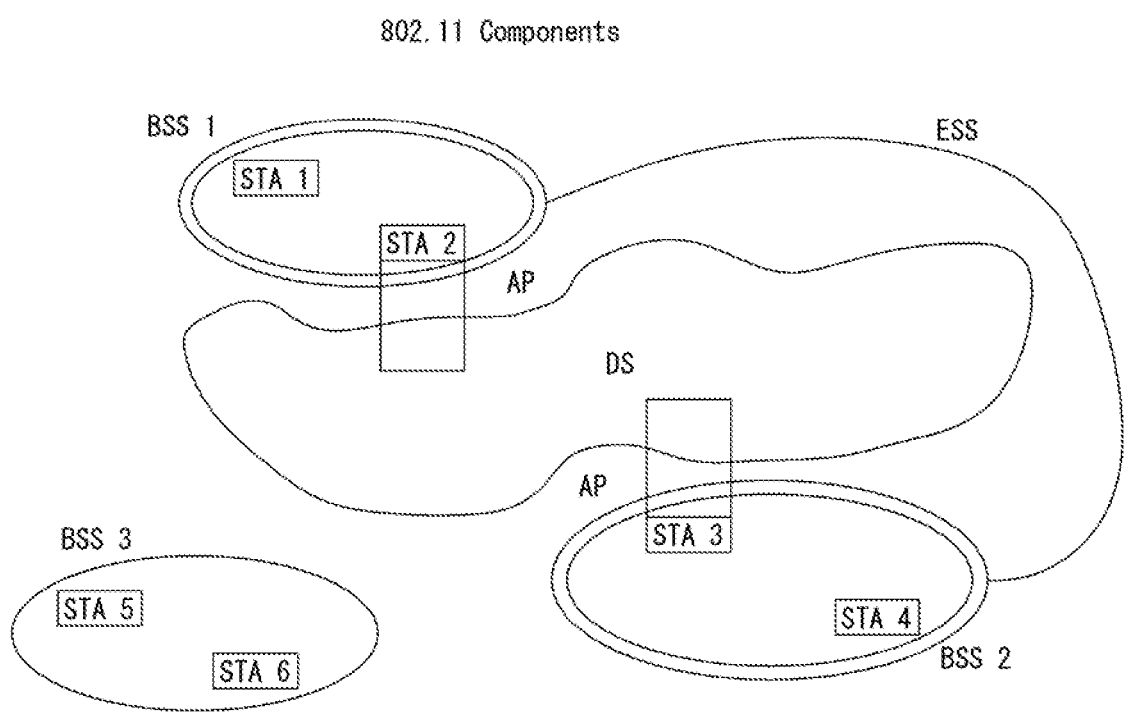

[FIG. 2]
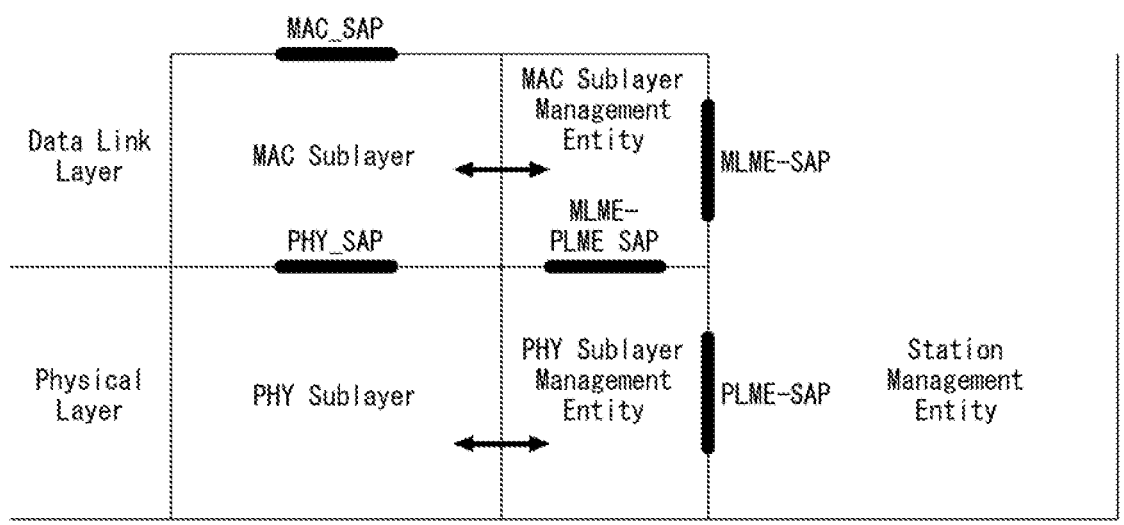

[FIG. 3]
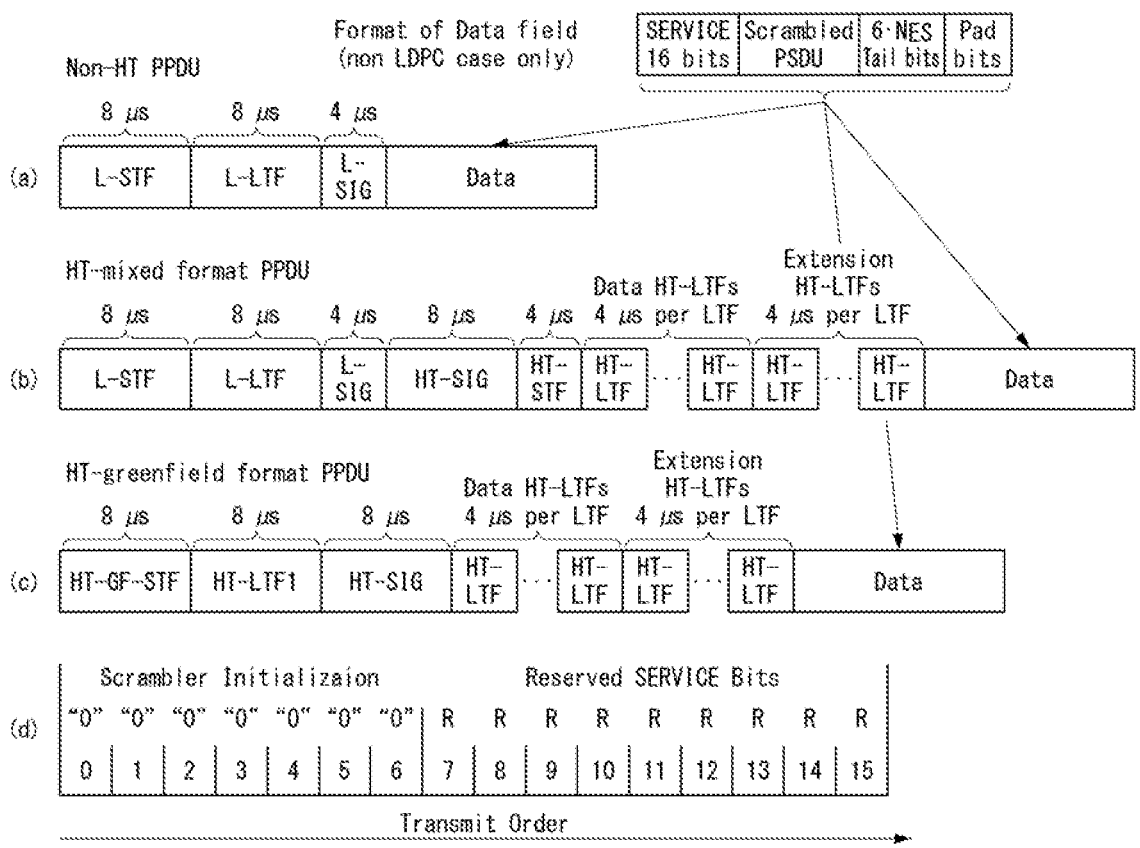

[FIG. 4]
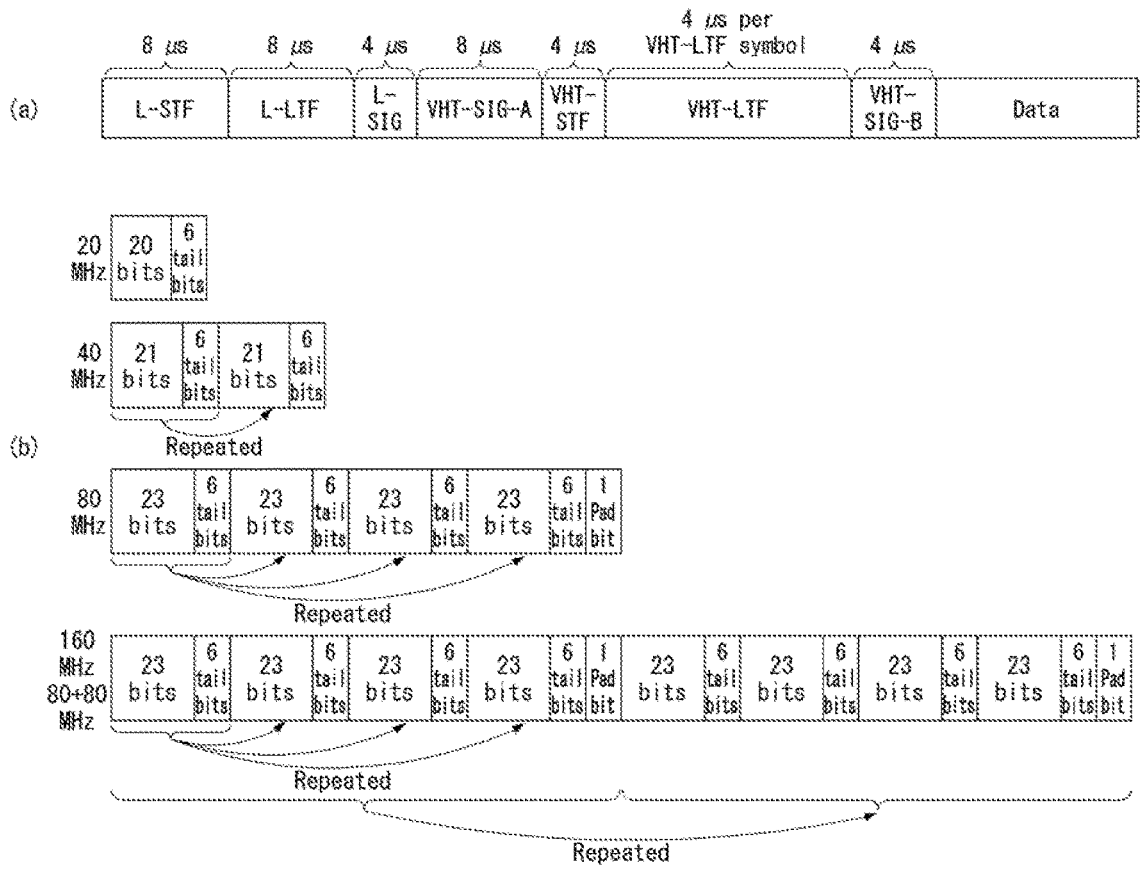
[FIG. 5]
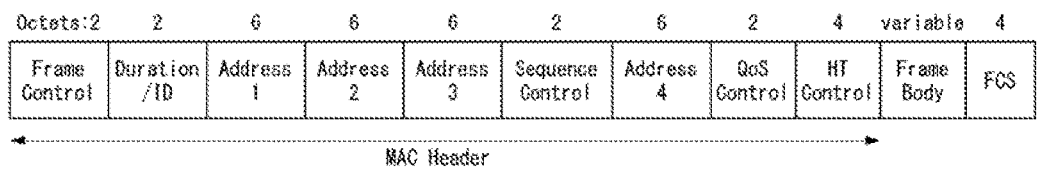
[FIG. 6]
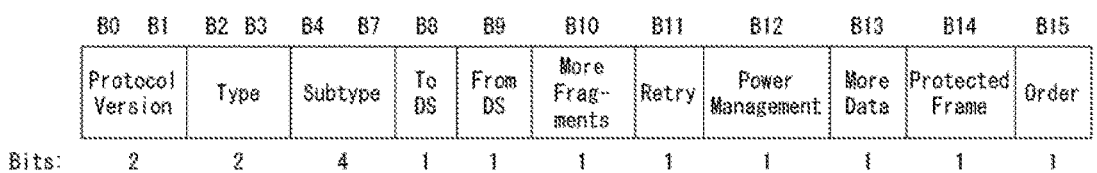

[FIG. 7]
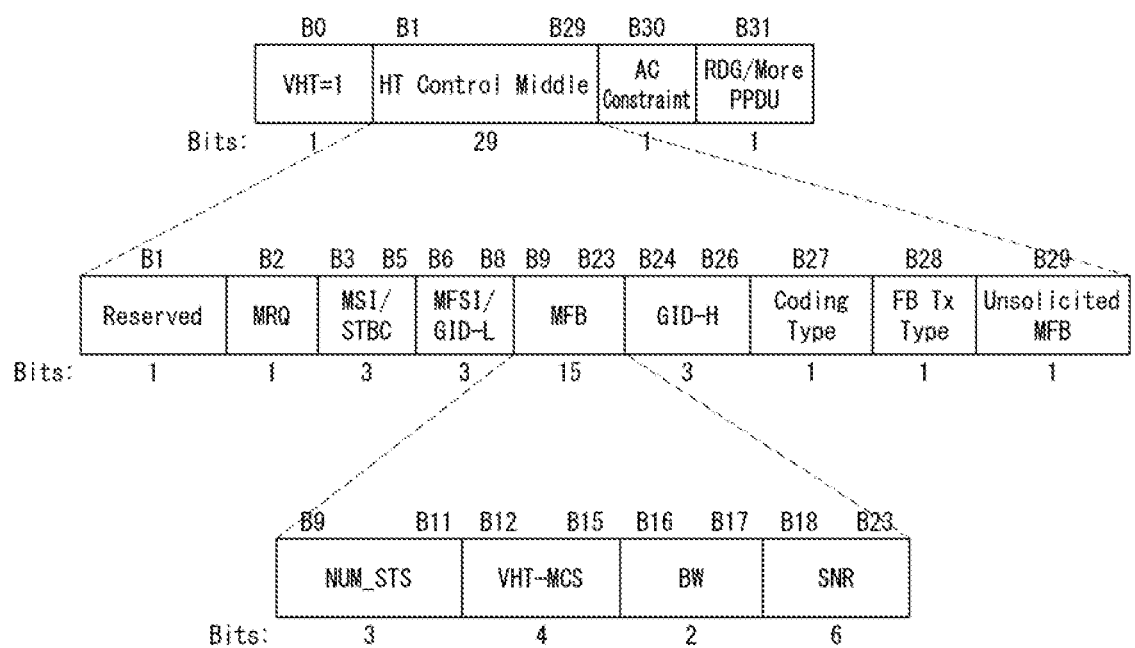

【FIG. 8】
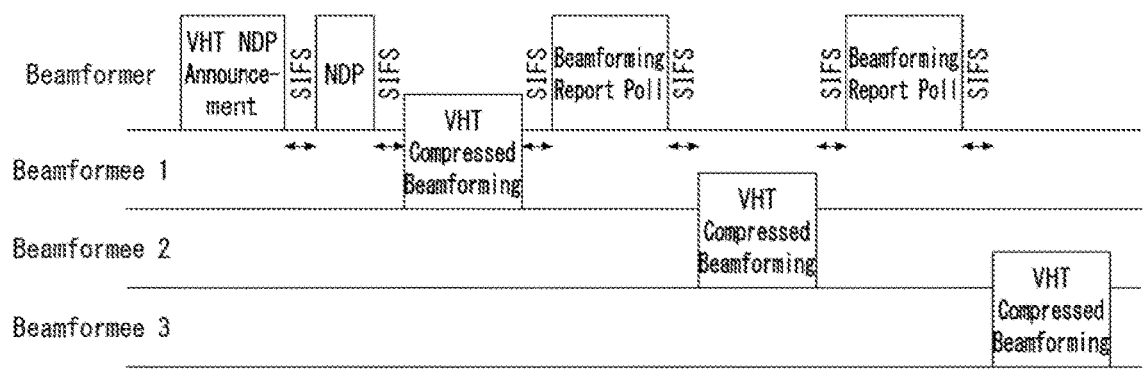
【FIG. 9】
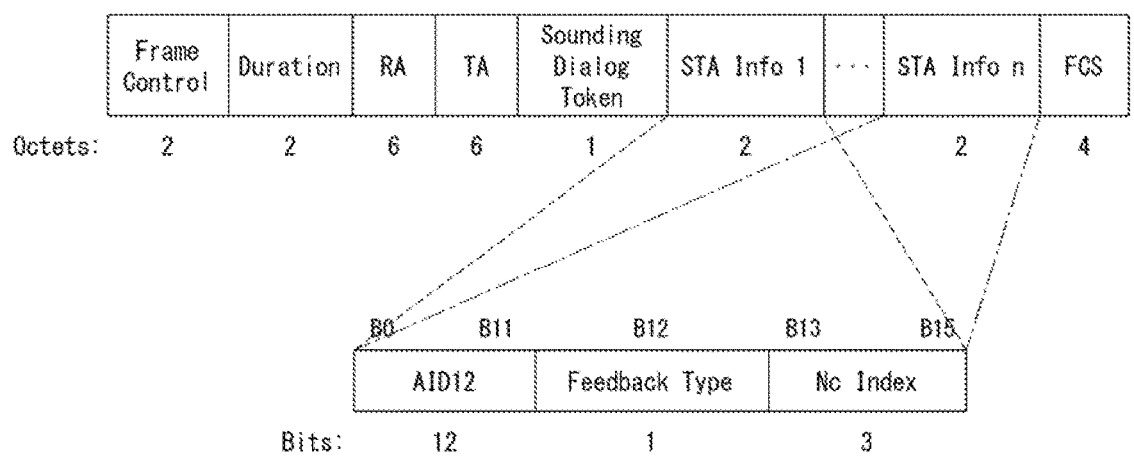

[FIG. 10]
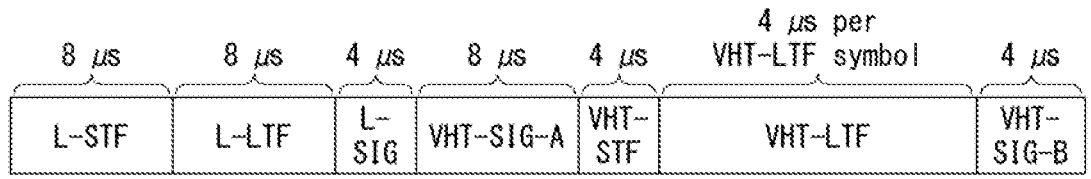
[FIG. 11]
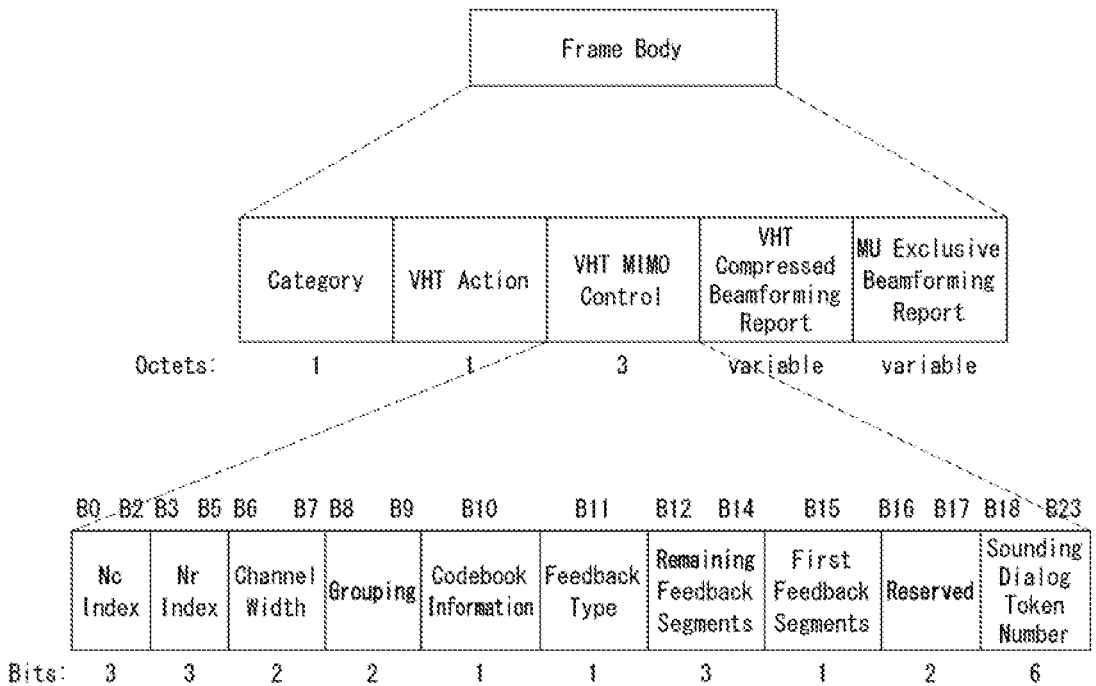
[FIG. 12]
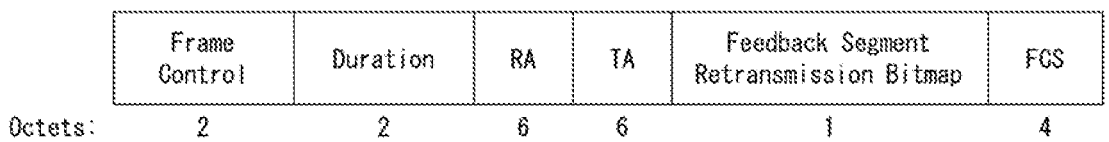

【FIG. 13】
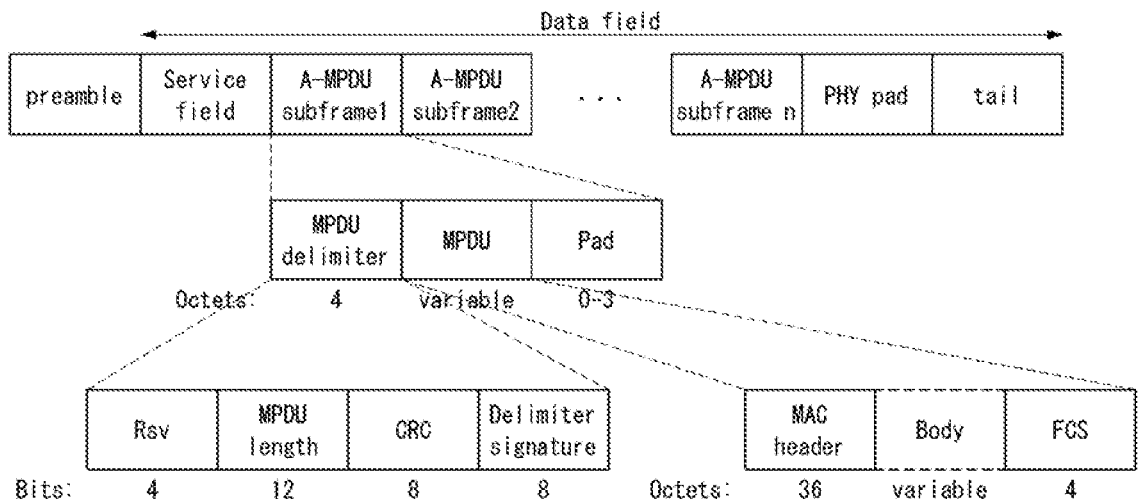
【FIG. 14】
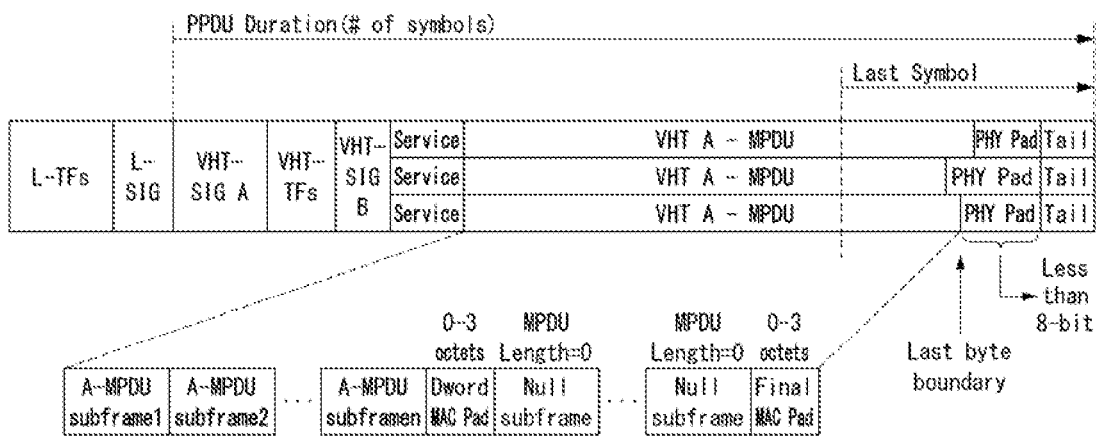

[FIG. 15]
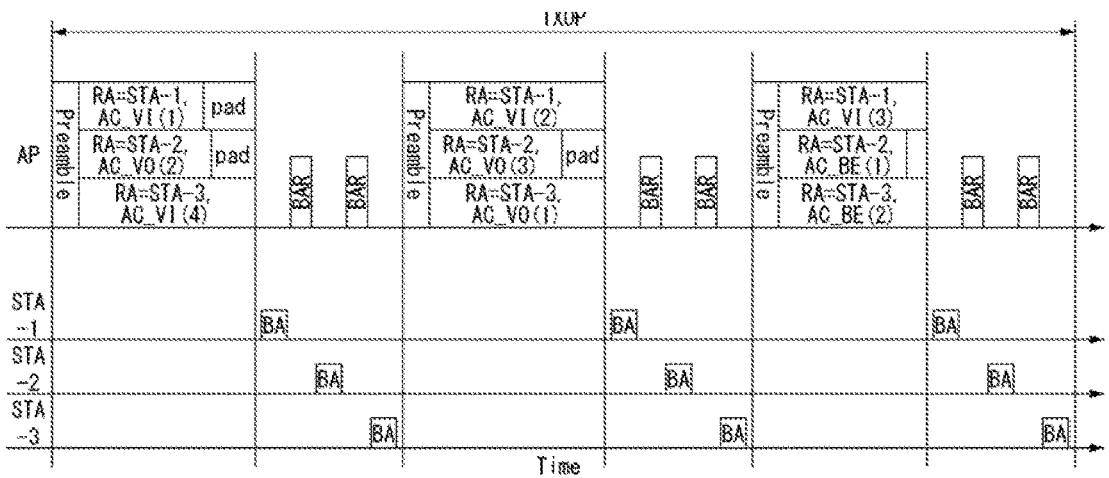
[FIG. 16]
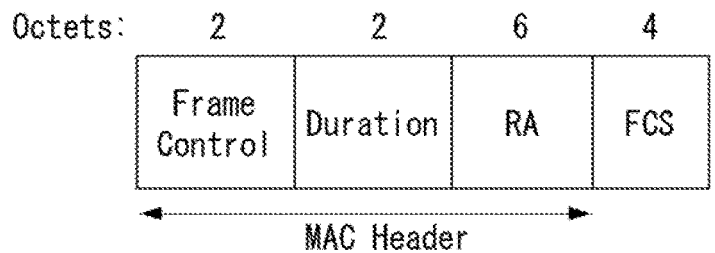
[FIG. 17]
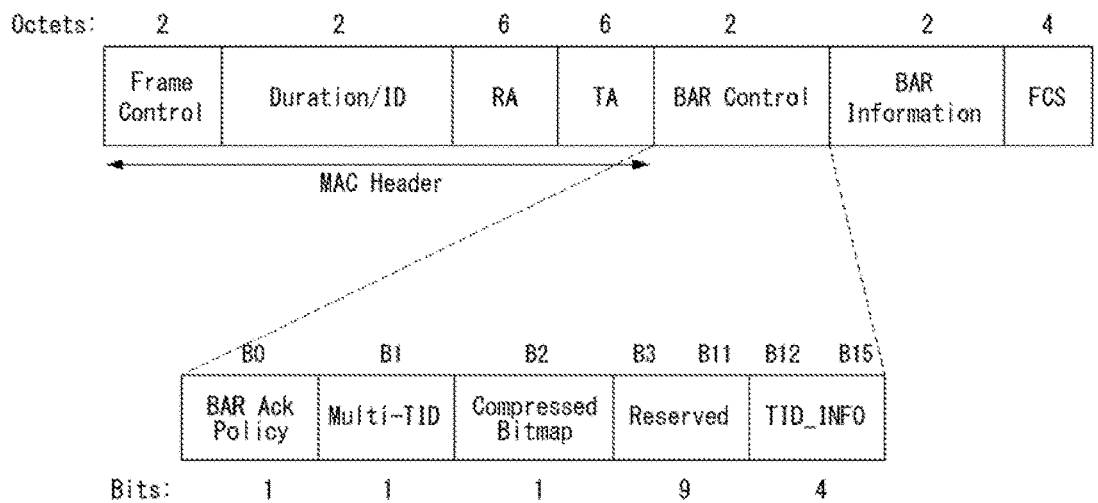

【FIG. 18】
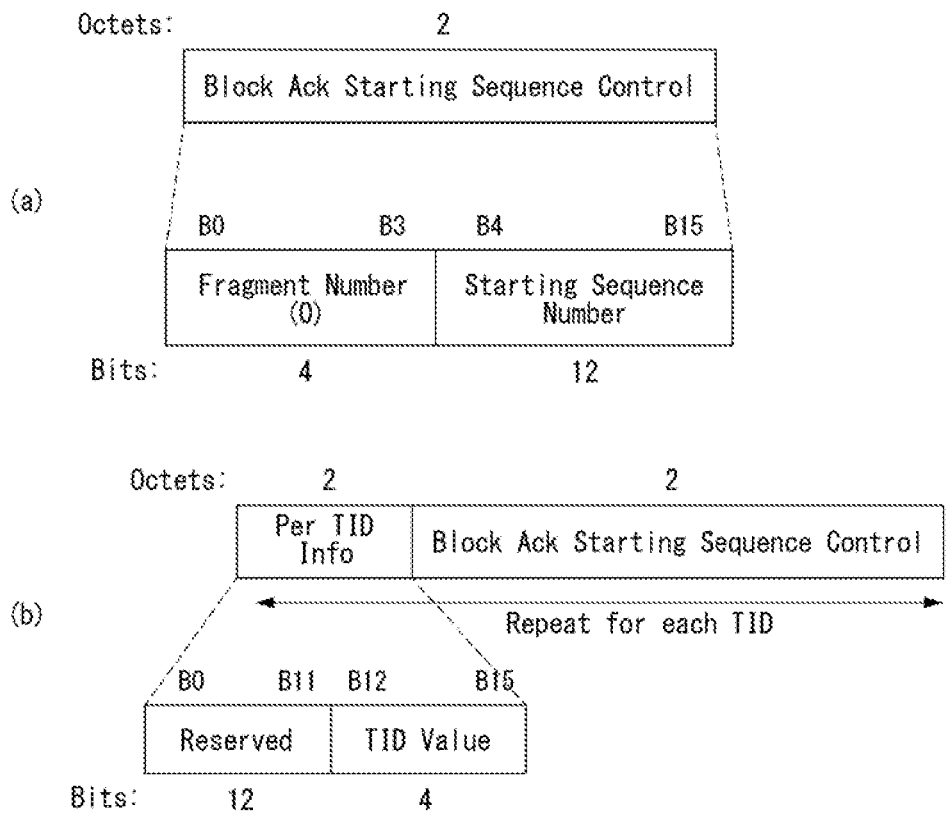
【FIG. 19】
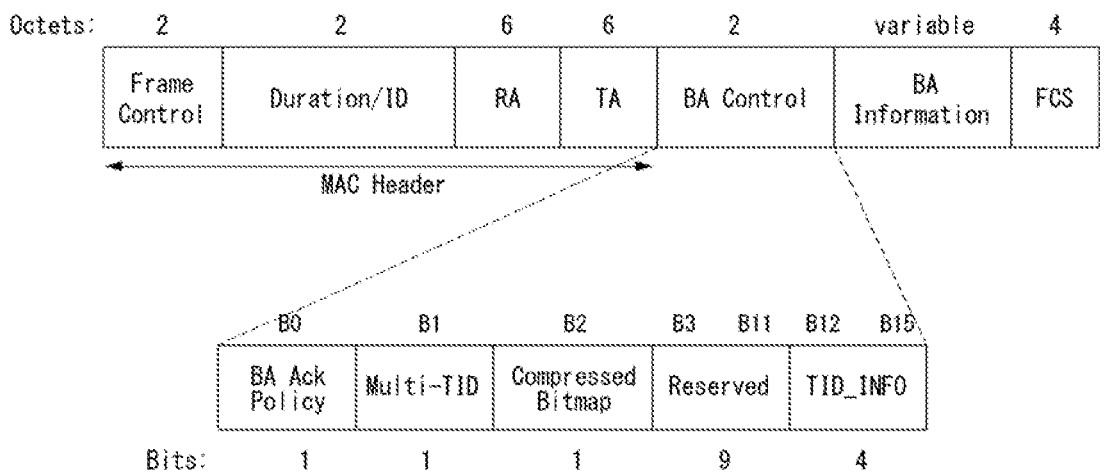

[FIG. 20]
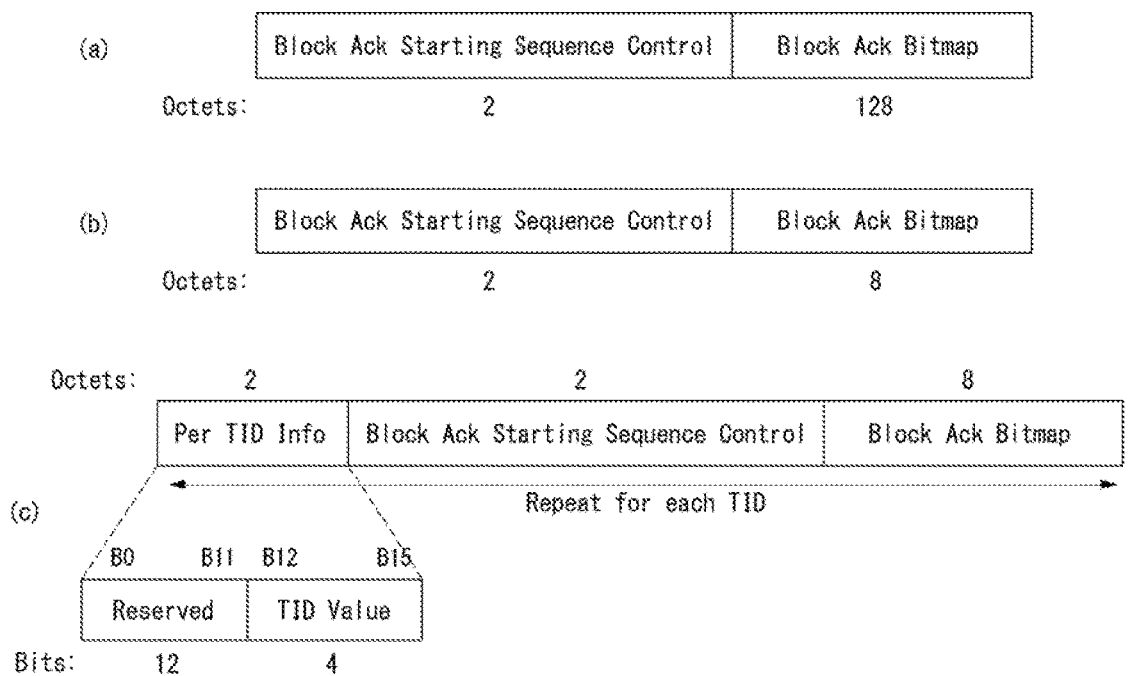
[FIG. 21]
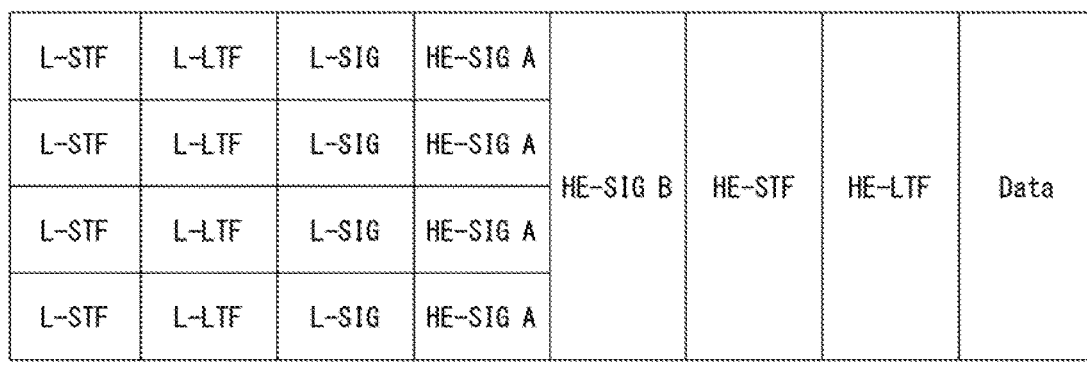

【FIG. 22】

| L-STF | L-LTF | L-SIG | HE-SIG A |          | HE-STF | HE-LTF | Data for STA1 |
|-------|-------|-------|----------|----------|--------|--------|---------------|
| L-STF | L-LTF | L-SIG | HE-SIG A |          | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A |          | HE-STF | HE-LTF | Data for STA4 |

【FIG. 23】

| L-STF | L-LTF | L-SIG | HE-SIG A | HE-SIG B | HE-STF | HE-LTF | Data for STA1 |
|-------|-------|-------|----------|----------|--------|--------|---------------|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

[FIG. 24]
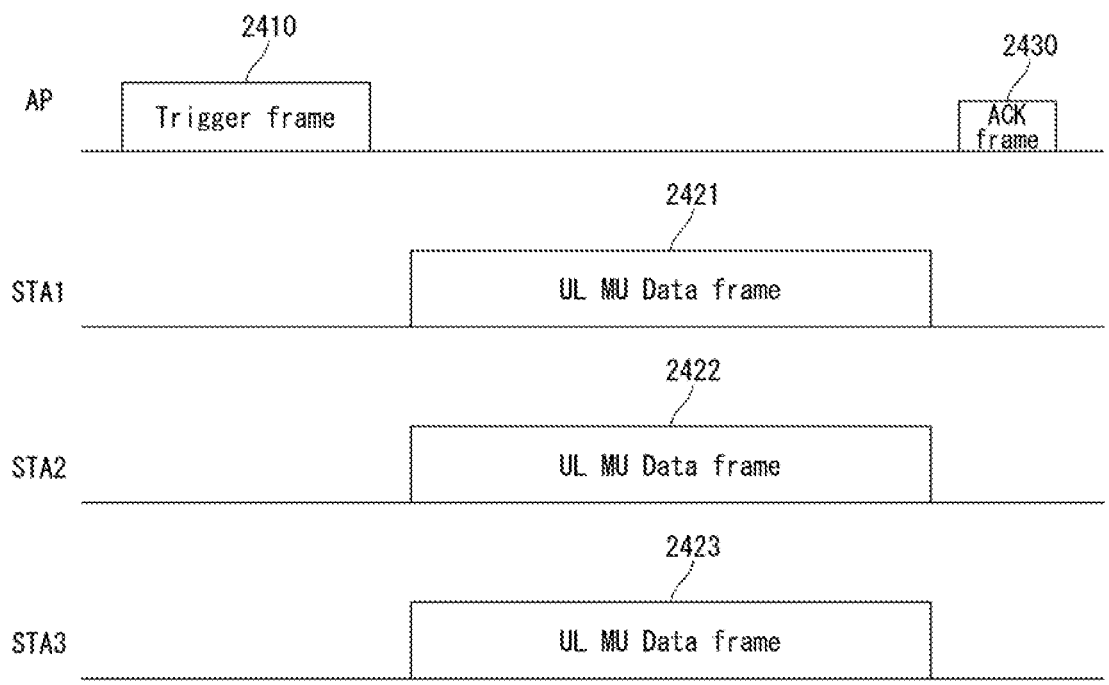

【FIG. 25】
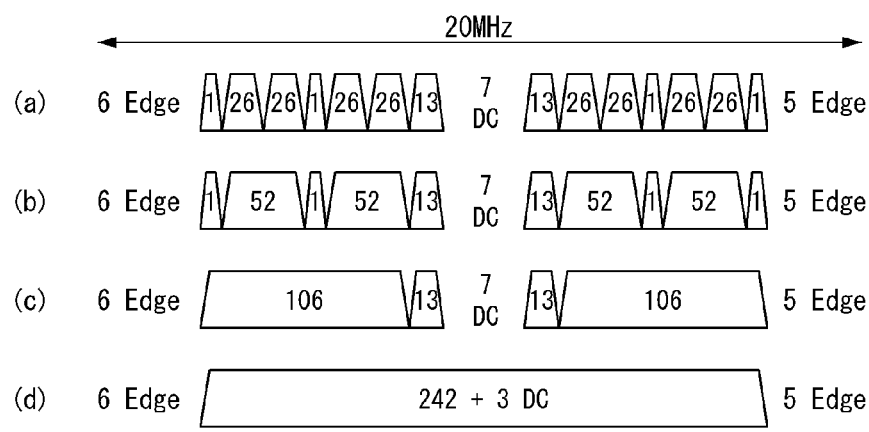

[FIG. 26]
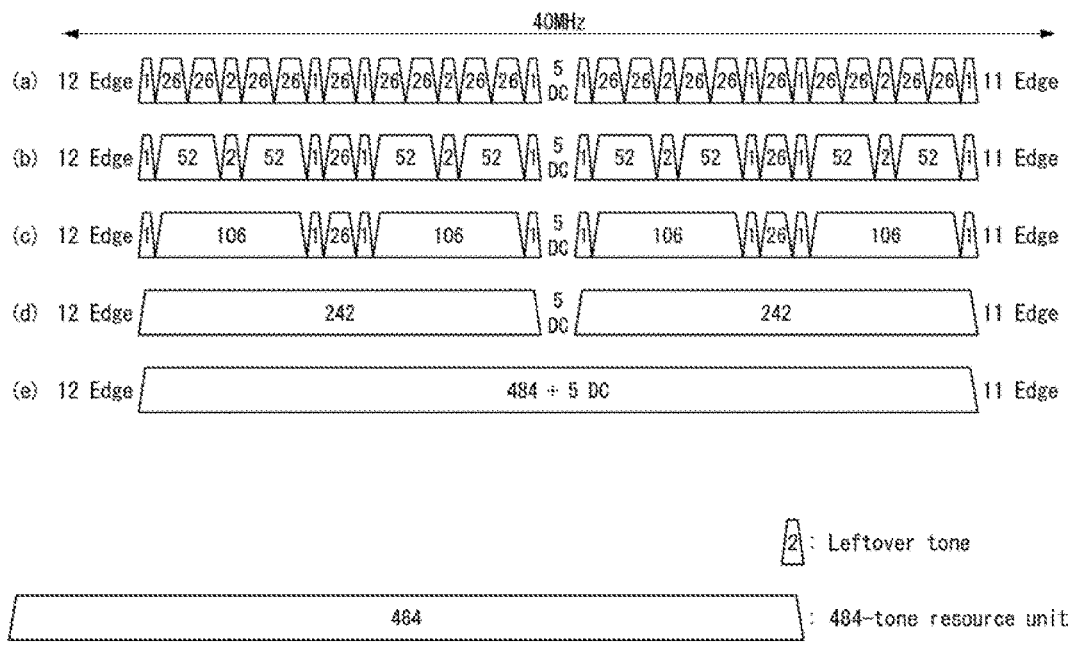
[FIG. 27]
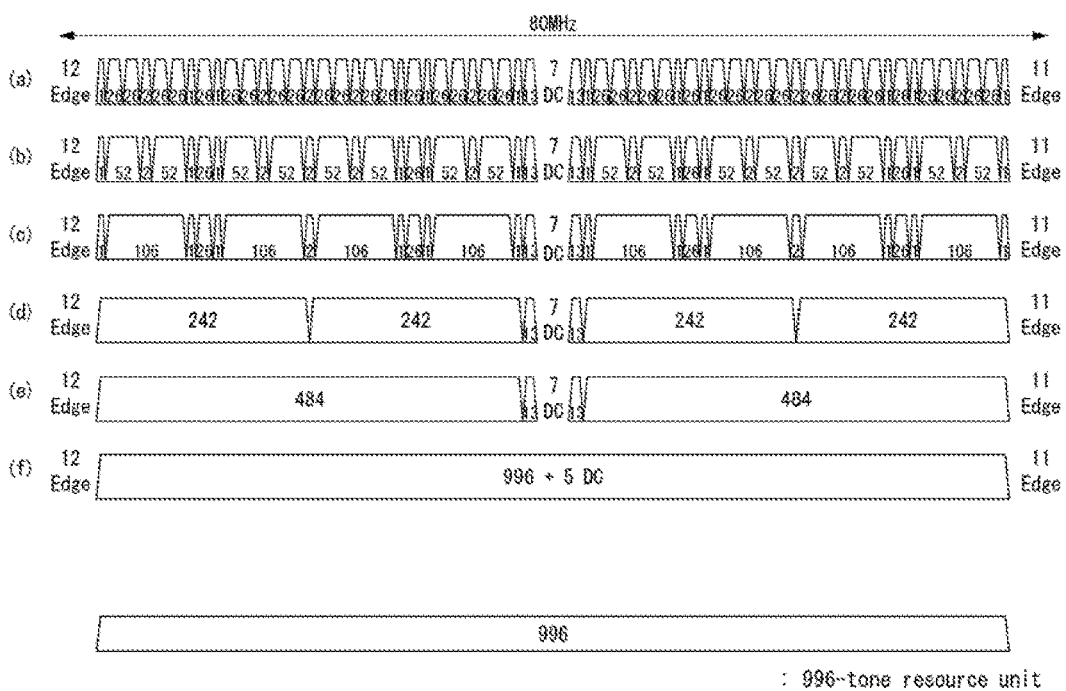

[FIG. 28]
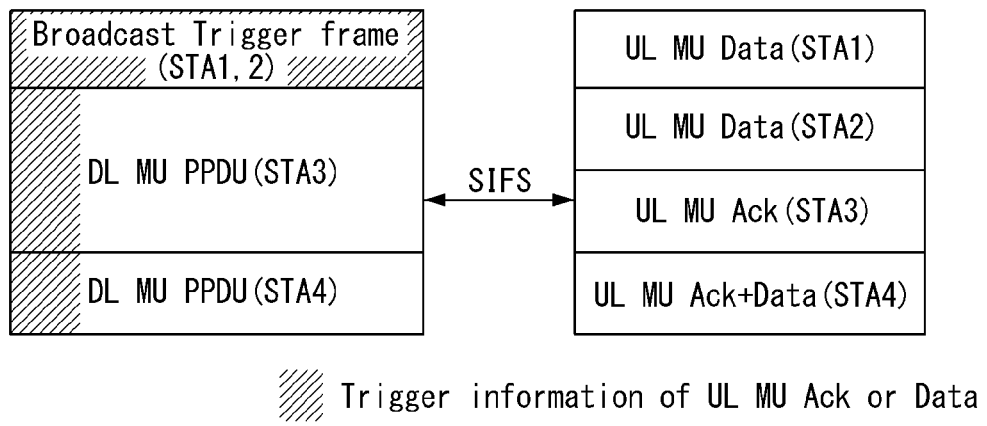
[FIG. 29]
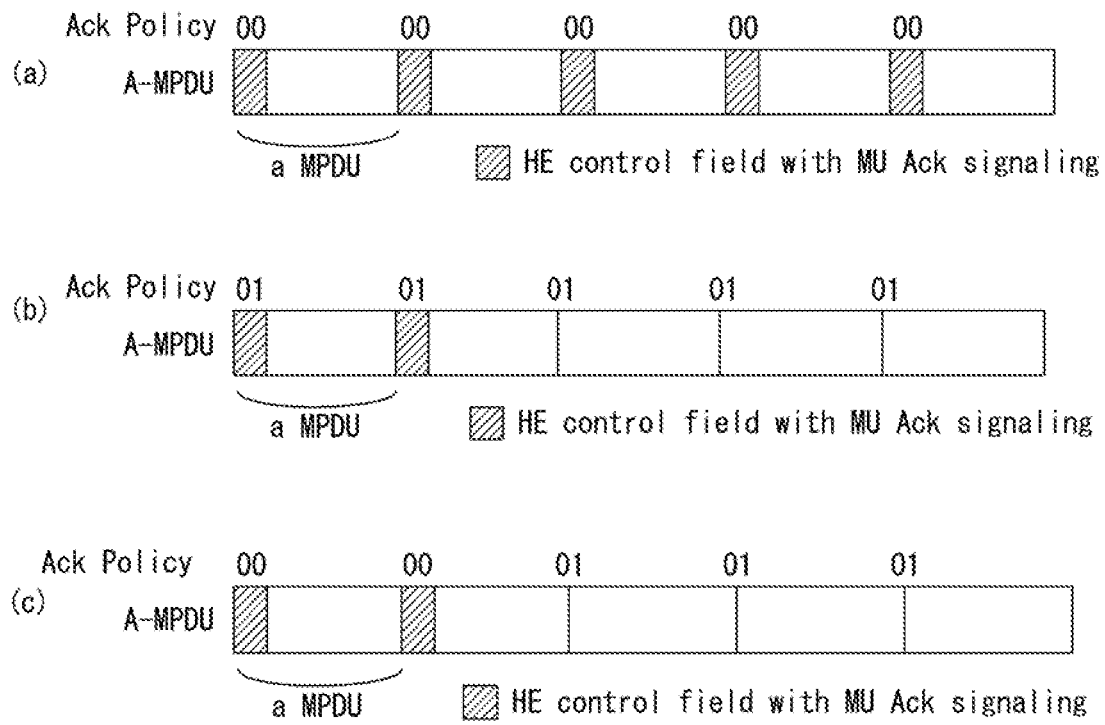

[FIG. 30]
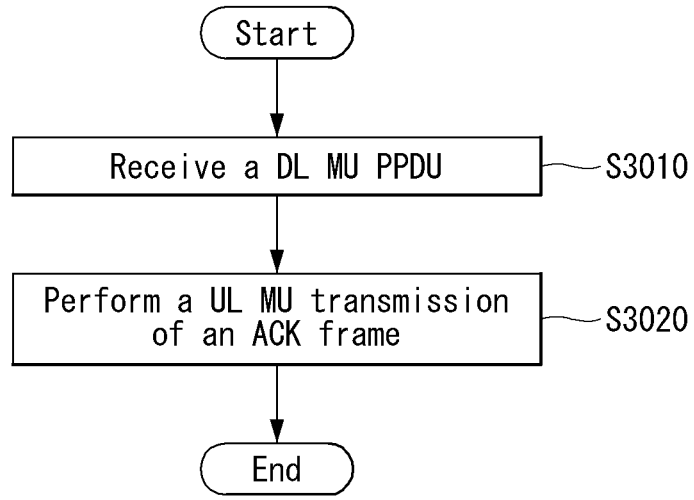
[FIG. 31]
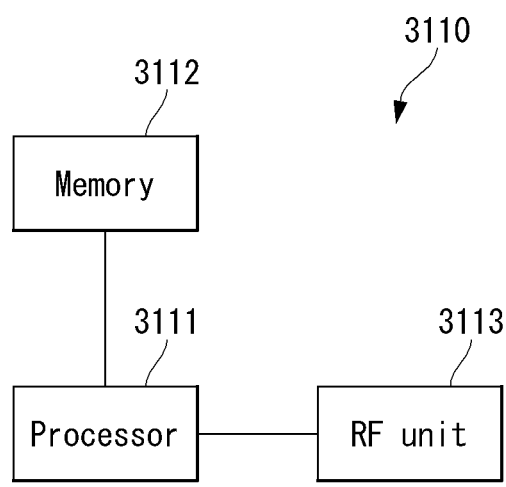

METHOD FOR TRANSMITTING DATA IN WIRELESS COMMUNICATION SYSTEM AND APPARATUS THEREFOR

CROSS-REFERENCE TO RELATED APPLICATIONS

This application is a continuation of U.S. patent application Ser. No. 15/745,663, filed on Jan. 17, 2018, now U.S. Pat. No. 10,560,242, which is the National Stage filing under 35 U.S.C. 371 of International Application No. PCT/KR2016/000805, filed on Jan. 26, 2016, which claims the benefit of U.S. Provisional Application No. 62/215,684, filed on Sep. 8, 2015 and U.S. Provisional Application No. 62/236,155, filed on Oct. 2, 2015, the contents of which are all hereby incorporated by reference herein in their entirety.

TECHNICAL FIELD

The present invention relates to wireless communication systems, and more particularly, to a method for transmitting data for supporting a transmission of multi-user ACK frame and a device for supporting the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

An object of the present invention is to propose a method for transmitting and receiving an uplink/downlink multi-user ACK frame in a wireless communication system.

In addition, an object of the present invention is to propose a method for indicating a transport format in an ACK frame.

In addition, an object of the present invention is to propose a method for signaling trigger information for an MU transmission of an ACK frame.

In addition, an object of the present invention is to propose a method for indicating a scheme of signaling trigger information for an MU transmission of an ACK frame.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In order to solve the technical problem, an embodiment of the present invention propose an STA device and a method for transmitting data performed by an STA device in a WLAN system.

A method for performing an uplink (UL) multi-user (MU) transmission performed by a station (STA) device in a Wireless LAN (WLAN) system according to an embodiment of the present invention may include receiving a Downlink (DL) MU Physical Protocol Data Unit (PPDU) including a physical preamble and a data field; and where the data field includes at least one Mac Protocol Data Unit (MPDU), where the at least one MPDU includes a trigger frame or a MAC header, and the trigger frame or the MAC header includes trigger information for a UL MU transmission of an ACK (Acknowledge) frame, and performing a UL MU transmission of the ACK frame in response to the DL MU PPDU based on the trigger information.

In addition, the trigger information may include frequency resource unit allocation information for an orthogonal frequency division multiple access (OFDMA) transmission of the ACK frame, and length information of a UL MU PPDU including the ACK frame.

In addition, when an ACK policy field of the at least one MPDU is '01', the step of performing the UL MU transmission of the ACK frame may correspond to a step of performing the UL MU transmission of the ACK frame as an immediate response to the DL MU PPDU based on the trigger information included in the at least one MPDU.

In addition, the immediate response to the DL MU PPDU may represent that the UL MU transmission of the ACK frame is performed after a Short Interframe Space (SIFS) from receiving the DL MU PPDU.

In addition, when an ACK policy field of all MPDUs included in the data field is '01' and a reception of the at least one MPDU is failed, performing the UL MU transmission of the ACK frame may not be performed.

In addition, when the trigger information is included in the MAC header of the at least one MPDU, the trigger information may be included in an HE control field in the MAC header.

In addition, the HE control field may be a HT control field of which first and second bits are set to '1', respectively.

In addition, a station (STA) device in a wireless LAN (WLAN) system according to another embodiment of the present invention may include an RF unit for transmitting and receiving a wireless signal; and a processor for controlling the RF unit, where the processor is configured to: receive a Downlink (DL) MU Physical Protocol Data Unit (PPDU) including a physical preamble and a data field; and where the data field includes at least one Mac Protocol Data Unit (MPDU), where the at least one MPDU includes a trigger frame or a MAC header, and the trigger frame or the MAC header includes trigger information for a UL MU transmission of an ACK (Acknowledge) frame, and perform a UL MU transmission of the ACK frame in response to the DL MU PPDU based on the trigger information.

In addition, the trigger information may include frequency resource unit allocation information for an orthogonal frequency division multiple access (OFDMA) transmission of the ACK frame, and length information of a UL MU PPDU including the ACK frame.

In addition, when an ACK policy field of the at least one MPDU is '01', the processor may perform the UL MU transmission of the ACK frame as an immediate response to the DL MU PPDU based on the trigger information included in the at least one MPDU.

In addition, the immediate response to the DL MU PPDU may represent that the transmission of the ACK frame is performed after a Short Interframe Space (SIFS) from receiving the DL MU PPDU.

In addition, when an ACK policy field of all MPDUs included in the data field is '01' and a reception of the at least one MPDU is failed, the processor may not perform the UL MU transmission of the ACK frame.

In addition, when the trigger information is included in the MAC header of the at least one MPDU, the trigger information may be included in an HE control field in the MAC header.

In addition, the HE control field may be a HT control field of which first and second bits are set to '1', respectively.

Technical Effects

According to an embodiment of the present invention, a transport format of an ACK frame is indicated, and accordingly, a collision owing to ACK frame transmissions of different formats of STAs may be prevented.

In addition, according to an embodiment of the present invention, since trigger information for an MU transmission of an ACK frame is signaled in various schemes, there is an effect that an efficient signaling scheme may be selectively applied depending on the situation.

In addition, other effects of the present invention will be additionally described in the embodiments below.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a diagram showing an example of an IEEE 802.11 system to which the present invention may be applied;

FIG. 2 is a diagram illustrating the structure of a layer architecture of an IEEE 802.11 system to which the present invention may be applied;

FIG. 3 illustrates a non-HT format PPDU and an HT format PPDU in a wireless communication system to which the present invention may be applied;

FIG. 4 illustrates a VHT format PPDU in a wireless communication system to which the present invention may be applied;

FIG. 5 illustrates a MAC frame format in an IEEE 802.11 system to which the present invention may be applied.

FIG. 6 is a diagram illustrating the frame control field in the MAC frame in a wireless communication system to which the present invention may be applied.

FIG. 7 illustrates the VHT format of an HT control field in a wireless communication system to which an embodiment of the present invention may be applied.

FIG. 8 is a diagram conceptually showing a method of channel sounding in a wireless communication system to which the present invention may be applied.

FIG. 9 is a diagram illustrating a VHT NDPA frame in a wireless communication system to which the present invention may be applied;

FIG. 10 is a diagram illustrating an NDP PPDU in a wireless communication system to which the present invention may be applied;

FIG. 11 is a diagram illustrating a VHT compressed beamforming frame format in a wireless communication system to which the present invention may be applied;

FIG. 12 is a diagram illustrating a Beamforming Report Poll frame format in a wireless communication system to which the present invention may be applied;

FIG. 13 is a diagram illustrating a downlink multi-user PPDU format in a wireless communication system to which the present invention may be applied;

FIG. 14 is a diagram illustrating a downlink multi-user PPDU format in a wireless communication system to which the present invention may be applied;

FIG. 15 is a diagram illustrating a downlink MU-MIMO transmission process in a wireless communication system to which the present invention may be applied;

FIG. 16 is a diagram illustrating an ACK frame in a wireless communication system to which the present invention may be applied;

FIG. 17 is a diagram illustrating a Block Ack Request frame in a wireless communication system to which the present invention may be applied;

FIG. 18 is a diagram illustrating the BAR Information field of a Block Ack Request frame in a wireless communication system to which the present invention may be applied;

FIG. 19 is a diagram illustrating a Block Ack frame in a wireless communication system to which the present invention may be applied.

FIG. 20 is a diagram illustrating the BA Information field of a Block Ack frame in a wireless communication system to which the present invention may be applied.

FIGS. 21 to 23 are diagrams illustrating a HE format PPDU according to an embodiment of the present invention.

FIG. 24 is a diagram illustrating an uplink multi-user transmission procedure according to an embodiment of the present invention.

FIGS. 25 to 27 are diagrams illustrating a resource allocation unit in an OFDMA multi-user transmission scheme according to an embodiment of the present invention.

FIG. 28 is a diagram illustrating a DL MU PPDU and a UL MU PPDU of a cascade scheme according to an embodiment of the present invention.

FIG. 29 is a diagram illustrating an ACK policy according to an embodiment of the present invention.

FIG. 30 is a flowchart illustrating a UL MU transmission method performed by an AP according to an embodiment of the present invention.

FIG. 31 is a block diagram of each STA device according to an embodiment of the present invention.

BEST MODE FOR INVENTION

The terms used in this specification were selected to include current, widely-used, general terms, in consideration of the functions of the present invention. However, the terms may represent different meanings according to the intentions of the skilled person in the art or according to customary usage, the appearance of new technology, etc. In certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present invention.

In addition, embodiments will be described in detail with reference to the accompanying drawings and contents illustrated in the accompanying drawings, but the present invention is not limited by the embodiments.

Hereinafter, embodiments of the present invention will be described in detail with reference to the accompanying drawings.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, IEEE 802.11 system is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In downlink, a transmitter may be part of an AP, and a receiver may be part of a non-AP STA. In uplink, a transmitter may be part of a non-AP STA, and a receiver may be part of an AP.

FIG. 2 is a diagram illustrating the structure of a layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer.

Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrates a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU is configured to include a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field may include a rate field of four bits, a reserved field of 1 bit, a length field of 12 bits, a parity bit of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

A field up to an HT-SIG field is transmitted without performing beamforming so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

Table 1 below illustrates the HT-SIG field.

TABLE 1

| Field | Bit | Description |
| --- | --- | --- |
| MCS | 7 | Indicate a modulation and coding scheme |
| CBW 20/40 | 1 | Set to "0" if a CBW is 20 MHz or 40 MHz or upper/lower<br>Set to "1" if a CBW is 40 MHz |
| HT length | 16 | Indicate the number of data octets within a PSDU |
| Smoothing | 1 | Set to "1" if channel smoothing is recommended<br>Set to "0" if channel estimation is recommended unsmoothingly for each carrier |
| Not-sounding | 1 | Set to "0" if a PPDU is a sounding PPDU<br>Set to "1" if a PPDU is not a sounding PPDU |
| Reserved | 1 | Set to "1" |
| Aggregation | 1 | Set to "1" if a PPDU includes an A-MPDU<br>Set to "0" if not |
| Space-time block coding (STBC) | 2 | Indicate a difference between the number of space-time streams (NSTS) and the number of spatial streams (NSS) indicated by an MCS<br>Set to "00" if an STBC is not used |
| FEC coding | 1 | Set to "1" if low-density parity check (LDPC) is used<br>Set to "0" if binary convolutional code (BCC) is used |
| Short GI | 1 | Set to "1" if a short guard interval (GI) is used after HT training<br>Set to "0" if not |
| Number of extension spatial streams | 2 | Indicate the number of extension spatial streams (NESSs)<br>Set to "0" if there is no NESS<br>Set to "1" if the number of NESSs is 1<br>Set to "2" if the number of NESSs is 2<br>Set to "3" if the number of NESSs is 3 |
| CRC | 8 | Include CRS for detecting an error of a PPDU on the receiver side |
| Tail bits | 6 | Used to terminate the trellis of a convolutional decoder<br>Set to "0" |

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

Table 2 illustrates the VHT-SIG-A1 field.

TABLE 2

| field | bit | description |
|---|---|---|
| BW | 2 | Set to "0" if a BW is 20 MHz<br>Set to "1" if a BW is 40 MHz<br>Set to "2" if a BW is 80 MHz<br>Set to "3" if a BW is 160 MHz or 80 + 80 MHz |
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| Group ID | 6 | Indicate a group ID<br>"0" or "63" indicates a VHT SU PPDU, but indicates a VHT MU PPDU if not |
| NSTS/Partial AID | 12 | In the case of a VHT MU PPDU, divide into 4 user positions "p" each having three bits<br>"0" if a space-time stream is 0<br>"1" if a space-time stream is 1<br>"2" if a space-time stream is 2<br>"3" if a space-time stream is 3<br>"4" if a space-time stream is 4<br>In the case of a VHT SU PPDU,<br>Upper 3 bits are set as follows:<br>"0" if a space-time stream is 1<br>"1" if a space-time stream is 2<br>"2" if a space-time stream is 3<br>"3" if a space-time stream is 4<br>"4" if a space-time stream is 5<br>"5" if a space-time stream is 6<br>"6" if a space-time stream is 7<br>"7" if a space-time stream is 8<br>Lower 9 bits indicate a partial AID. |

TABLE 2-continued

| field | bit | description |
|---|---|---|
| TXOP_PS_NOT_AL-LOWED | 1 | Set to "0" if a VHT AP permits a non-AP VHT STA to switch to power save mode during transmission opportunity (TXOP)<br>Set to "1" if not<br>In the case of a VHT PPDU transmitted by a non-AP VHT STA<br>Set to "1" |
| Reserved | 1 | |

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 illustrates the VHT-SIG-A2 field.

TABLE 3

| field | bit | description |
|---|---|---|
| Short GI | 1 | Set to "0" if a short GI is not used in a data field<br>Set to "1" if a short GI is used in a data field |
| Short GI disambig-uation | 1 | Set to "1" if a short GI is used and an extra symbol is required for the payload of a PPDU<br>Set to "0" if an extra symbol is not required |
| SU/MU coding | 1 | In the case of a VHT SU PPDU:<br>Set to "0" in the case of binary convolutional code (BCC)<br>Set to "1" in the case of low-density parity check (LDPC)<br>In the case of a VHT MU PPDU:<br>Indicate coding used if the NSTS field of a user whose user position is "0" is not "0"<br>Set to "0" in the case of BCC<br>Set to "1" in the case of PDPC<br>Set to "1" as a reserved field if the NSTS field of a user whose user position is "0" is "0" |
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU)<br>Set to "0" if not |
| SU VHT MCS/MU coding | 4 | In the case of a VHT SU PPDU:<br>Indicate a VHT-MCS index<br>In the case of a VHT MU PPDU:<br>Indicate coding for user positions "1" to "3" sequentially from upper bits<br>Indicate coding used if the NSTS field of each user is not "1"<br>Set to "0" in the case of BCC<br>Set to "1" in the case of LDPC<br>Set to "1" as a reserved field if the NSTS field of each user is "0" |
| Beamformed | 1 | In the case of a VHT SU PPDU:<br>Set to "1" if a beamforming steering matrix is applied to SU transmission<br>Set to "0" if not<br>In the case of a VHT MU PPDU:<br>Set to "1" as a reserved field |
| Reserved | 1 | |
| CRC | 8 | Include CRS for detecting an error of a PPDU on the receiver side |
| Tail | 6 | Used to terminate the trellis of a convolutional decoder<br>Set to "0" |

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAB to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 160 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

MAC Frame Format

FIG. 5 illustrates a MAC frame format in an IEEE 802.11 system to which the present invention may be applied.

Referring to FIG. 5, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field contains information on the characteristics of the MAC frame. A more detailed description of the frame control field will be given later.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame. Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

An address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield. Bits 5-6 of the QoS control field may include an ACK policy field. Table 4 exemplifies the ACK policy field within the QoS control field.

TABLE 4

| Bits in QoS Control field | | Meaning |
|---|---|---|
| Bit 5 | Bit 6 | |
| 0 | 0 | Normal Ack or Implicit BAR<br>In the case of a Non-A-MPDU frame or a VHT single MPDU frame:<br>A receiver responds with an Ack or OoS + CF-Ack frame after an SIFS (a short interframe space).<br>Otherwise:<br>A receiver responds individually or with a BA frame as a part of A-MPDU after receiving a PPDU that carries a received frame and after an SIFS. |
| 1 | 0 | No Ack<br>A receiver takes no action when receiving the corresponding frame.<br>A transmitter sets '10' to the ACK policy subfield individually for specific frames that do not want to receive an ACK.<br>A transmitter also sets '10' to the ACK policy subfield of all group designated frames that use the QoS frame format except the TID in which a Block Ack agreement is existed.<br>The ACK policy subfield is not set to '10' for the QoS data frame that has the TID in which a Block Ack agreement is existed.<br>The ACK policy subfield of a group designated QoS Null frame (No data) is set to '10'. |
| 0 | 1 | No explicit acknowledge or PSMP Ack<br>In the case that Bit 6 of a Frame Control field is set to 1 (i.e., No data):<br>A response frame in response to a received frame is existed, but it is not an ACK frame or a subtype + CF-Ack data frame.<br>The ACK policy subfield for QoS CF-Poll and QoS CF-Ack + CF-Poll Data frames is set to '01'.<br>In the case that Bit 6 of a Frame Control field is set to 0:<br>In the case that the frame indicating a PSMP ACK is shown during a PSMP downlink transmission time (PSMP-DTT), the ACK for a frame indicating the PSMP ACK is received after the PSMP uplink transmission time (PSMP-UTT). The ACK for the frame indicating the PSMP ACK during the PSMPUTT is received after the PSMP-DTT.<br>Bit 6 of the NOTE-Frame Control field indicates that a data payload is not existed. When Bit 6 is 1, the QoS data frame does not include a payload, and a certain response is generated for a QoS CF-Poll or QoS CF-Ack + CF-Poll frame, which does not mean the ACK for the data.<br>When Bit 6 is 0, the QoS data frame includes a payload. |
| 1 | 1 | BA<br>A receiver does not take any action except for recording the frame when the frame is received. Next, the receiver waits for receiving BlockAckReq frame. |

The HT control field includes control information related to an HT and/or VHT transmission/reception scheme. The HT control field is included in a control wrapper frame. Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

FIG. 6 is a diagram illustrating the frame control field in the MAC frame in a wireless communication system to which the present invention may be applied.

Referring to FIG. 6, the frame control field includes a Protocol Version subfield, a Type subfield, a Subtype subfield, a to DS subfield, a From DS subfield, a More Fragments subfield, a Retry subfield, a Power Management subfield, a More Data subfield, a Protected Frame subfield, and an Order subfield.

The protocol version subfield may indicate the version of a WLAN protocol applied to the MAC frame.

The type subfield and the subtype subfield may be configured to indicate information for identifying the function of the MAC frame.

The MAC frame may include three frame types: Management frames, Control frames, and Data frames.

Each frame type may be subdivided into subtypes.

For example, the Control frames may include an RTS (request-to-send) frame, a CTS (clear-to-send) frame, an ACK (Acknowledgement) frame, a PS-Poll frame, a CF (contention free)-End frame, a CF-End+CF-ACK frame, a BAR (Block Acknowledgement request) frame, a BA (Block Acknowledgement) frame, a Control Wrapper (Control+ HTcontrol) frame, a VHT NDPA (Null Data Packet Announcement) frame, and a Beamforming Report Poll frame.

The Management frames may include a Beacon frame, an ATIM (Announcement Traffic Indication Message) frame, a Disassociation frame, an Association Request/Response frame, a Reassociation Request/Response frame, a Probe Request/Response frame, an Authentication frame, a Deauthentication frame, an Action frame, an Action No ACK frame, and a Timing Advertisement frame.

The To Ds subfield and the From DS subfield may contain information required to interpret the Address 1 field through Address 4 field included in the MAC frame header. For a Control frame, the To DS subfield and the From DS subfield may all set to '0'. For a Management frame, the To DS subfield and the From DS subfield may be set to '1' and '0', respectively, if the corresponding frame is a QoS Management frame (QMF); otherwise, the To DS subfield and the From DS subfield all may be set to '0'.

The More Fragments subfield may indicate whether there is a fragment to be sent subsequent to the MAC frame. If there is another fragment of the current MSDU or MMPDU, the More Fragments subfield may be set to '1'; otherwise, it may be set to '0'.

The Retry subfield may indicate whether the MAC frame is the previous MAC frame that is re-transmitted. If the MAC frame is the previous MAC frame that is re-transmitted, the Retry subfield may be set to '1'; otherwise, it may be set to '0'.

The Power Management subfield may indicate the power management mode of the STA. If the Power Management subfield has a value of '1', this may indicate that the STA switches to power save mode.

The More Data subfield may indicate whether there is a MAC frame to be additionally sent. If there is a MAC frame to be additionally sent, the More Data subfield may be set to '1'; otherwise, it may be set to '0'.

The Protected Frame subfield may indicate whether a Frame Body field is encrypted or not. If the Frame Body field contains information that is processed by a cryptographic encapsulation algorithm, it may be set to '1'; otherwise '0'.

Information contained in the above-described fields may be as defined in the IEEE 802.11 system. Also, the above-described fields are examples of the fields that may be included in the MAC frame but not limited to them. That is, the above-described fields may be substituted with other fields or further include additional fields, and not all of the fields may be necessarily included.

FIG. 7 illustrates the VHT format of an HT control field in a wireless communication system to which an embodiment of the present invention may be applied.

Referring to FIG. 7, the HT control field may include a VHT subfield, an HT control middle subfield, an AC constraint subfield, and a reverse direction grant (RDG)/more PPDU subfield.

The VHT subfield indicates whether the HT control field has the format of an HT control field for VHT (VHT=1) or has the format of an HT control field for HT (VHT=0). In FIG. 8, it is assumed that the HT control field is an HT control field for VHT (i.e., VHT=1). The HT control field for VHT may be called a VHT control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set as "1" if an RDG is present, and the RDG/more PPDU subfield is set as "0" if an RDG is not present. Assuming that a corresponding field is transmitted by an RD responder, the RDG/more PPDU subfield is set as "1" if a PPDU including the corresponding subfield is the last frame transmitted by the RD responder, and the RDG/more PPDU subfield is set as "0" if another PPDU is transmitted.

As described above, the HT control middle subfield may be implemented to a different format depending on the indication of a VHT subfield.

The HT control middle subfield of an HT control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Table 5 illustrates a description of each subfield included in the HT control middle subfield of the VHT format.

TABLE 5

| subfield | meaning | definition |
| --- | --- | --- |
| MRQ | MCS request | Set to "1" if MCS feedback (solicited MFB) is not requested<br>Set to "0" if not |
| MSI | MRQ sequence identifier | An MSI subfield includes a sequence number within a range of 0 to 6 to identify a specific request if an unsolicited MFB subfield is set to "0" and an MRQ subfield is set to "1."<br>Include a compressed MSI subfield (2 bits) and an STBC indication subfield (1 bit) if an unsolicited MFB subfield is "1." |
| MFSI/GID-L | MFB sequence identifier/LSB of group ID | An MFSI/GID-L subfield includes the received value of an MSI included within a frame related to MFB information if an unsolicited MFB subfield is set to "0."<br>An MFSI/GID-L subfield includes the lowest three bits of a group ID of a PPDU estimated by an MFB if an MFB is estimated from an MU PPDU. |

TABLE 5-continued

| subfield | meaning | definition |
| --- | --- | --- |
| MFB | VHT N_STS, MCS, BW, SNR feedback | An MFB subfield includes recommended MFB. VHT-MCS = 15, NUM_STS = 7 indicates that feedback is not present. |
| GID-H | MSB of group ID | A GID-H subfield includes the most significant bit 3 bits of a group ID of a PPDU whose solicited MFB has been estimated if an unsolicited MFB field is set to "1" and MFB has been estimated from a VHT MU PPDU. All of GID-H subfields are set to "1" if MFB is estimated from an SU PPDU. |
| Coding Type | Coding type or MFB response | If an unsolicited MFB subfield is set to "1", a coding type subfield includes the coding type (binary convolutional code (BCC) includes 0 and low-density parity check (LDPC) includes 1) of a frame whose solicited MFB has been estimated |
| FB Tx Type | Transmission type of MFB response | An FB Tx Type subfield is set to "0" if an unsolicited MFB subfield is set to "1" and MFB has been estimated from an unbeamformed VHT PPDU. An FB Tx Type subfield is set to "1" if an unsolicited MFB subfield is set to "1" and MFB has been estimated from a beamformed VHT PPDU. |
| Unsolicited MFB | Unsolicited MCS feedback indicator | Set to "1" if MFB is a response to MRQ Set to "0" if MFB is not a response to MRQ |

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field, additional fields may be further included, and all of the fields may not be essentially included.

Channel State Information Feedback Method

SU-MIMO technology, in which a beamformer assigns all antennas to one beamformee for communication, enhances channel capacity through spatial-temporal diversity gain and multi-stream transmission. SU-MIMO technology uses more antennas than when MIMO technology is not used, thereby leveraging spatial degrees of freedom and contributing to the improvement of a physical layer.

MU-MIMO technology, in which a beamformer assigns antennas to multiple beamformees, can improve the performance of MIMO antennas by increasing the per-beamformee transfer rate or channel reliability through a link layer protocol for multiple access of multiple beamformees connected to the beamformer.

In MIMO environments, performance depends largely on how accurate channel information the beamformer acquires. Thus, a feedback procedure is required to acquire channel information.

There are largely two types of feedback supported to acquire channel information: one is to use a control frame and the other is to use a channel sounding procedure which does not include a data field. Sounding refers to using a preamble training field to measure channel for other purposes than data demodulation of a PPDU including the corresponding training field.

Hereinafter, a channel information feedback method using a control frame and a channel information feedback method using an NDP (null data packet) will be described in more detail.

1) Feedback Method Using Control Frame

In MIMO environments, a beamformer may instruct a beamformee to send channel state information feedback through the HT control field included in the MAC header, or the beamformee may report channel state information through the HT control field included in the MAC header (see FIG. 8). The HT control field may be included in a Control Wrapper frame, a QoS Data frame in which the Order subfield of the MAC header is set to 1, and a Management frame.

2) Feedback Using Channel Sounding

FIG. 8 is a diagram conceptually showing a method of channel sounding in a wireless communication system to which the present invention may be applied.

FIG. 8 illustrates a method of feedback of channel state information between a beamformer (e.g., AP) and a beamformee (e.g., non-AP STA) based on a sounding protocol. The sounding protocol may refer to a procedure of receiving feedback about information on channel state information.

A method of sounding channel state information between a beamformer and a beamformee based on a sounding protocol may be performed in the following steps:

(1) A beamformer transmits a VHT NDPA (VHT Null Data Packet Announcement) frame indicating sounding and transmission for feedback from a beamformee.

The VHT NDPA frame refers to a control frame that is used to indicate that channel sounding is initiated and an NDP (Null Data Packet) is transmitted. In other words, a VHT NDPA frame may be transmitted before NDP transmission to allow a beamformee to ready to feed back channel state information before receiving the NDP frame.

The VHT NDPA frame may contain AID (association identifier) information, feedback type information, etc. of a beamformee that will transmit an NDP. A more detailed description of the VHT NDPA frame will be given later.

The VHT NDPA frame may be transmitted in different ways for MU-MIMO-based data transmission and SU-MIMO-based data transmission. For example, in the case of channel sounding for MU-MIMO, the VHT NDPA frame may be transmitted in a broadcast manner, whereas, in the case of channel sounding for SU-MIMO, the VHT NDPA frame may be transmitted in a unicast manner.

(2) After transmitting the VHT NDPA frame, the beamformer transmits an NDP after an SIFS. The NDP has a VHT PPDU structure but without a data field.

Beamformees that have received the VHT NDPA frame may check the value of the AID12 subfield included in the STA information field and determine whether they are a target STA for sounding.

Moreover, the beamformees may know their order of feedback through the STA Info field included in the NDPA. FIG. 11 illustrates that feedback occurs in the order of Beamformee 1, Beamformee 2, and Beamformee 3.

(3) Beamformee 1 acquires downlink channel state information based on the training field included in the NDP and generates feedback information to send to the beamformer. Beamformee 1 transmits a VHT compressed beamforming frame containing feedback information to the beamformer after an SIFS after receiving the NDP frame.

The VHT compressed beamforming frame may include an SNR value for a space-time stream, information on a compressed beamforming feedback matrix for a subcarrier, and so on. A more detailed description of the VHT compressed beamforming frame will be provided later.

(4) The beamformer receives the VHT compressed beamforming frame from Beamformee 1, and then, after an SIFS, transmits a Beamforming Report Poll frame to Beamformee 2 in order to acquire channel information from Beamformee 2.

The Beamforming Report Poll frame is a frame that performs the same role as the NDP frame. Beamformee 2 may measure channel state based on the transmitted Beamforming Report Poll frame.

A more detailed description of the Beamforming Report Poll frame will be given later.

(5) After receiving the Beamforming Report Poll frame, Beamformee 2 transmits a VHT Compressed Beamforming frame containing feedback information to the beamformer after an SIFS.

(6) The beamformer receives the VHT Compressed Beamforming frame from Beamformee 2 and then, after an SIFS, transmits a Beamforming Report Poll frame to Beamformee 3 in order to acquire channel information from Beamformee 3.

(7) After receiving the Beamforming Report Poll frame, Beamformee 3 transmits a VHT Compressed Beamforming frame containing feedback information to the beamformer after an SIFS.

Hereinafter, a frame used for the above-described channel sounding procedure will be discussed.

FIG. 9 is a diagram illustrating a VHT NDPA frame in a wireless communication system to which the present invention may be applied.

Referring to FIG. 9, a VHT NDPA frame may consist of a Frame Control field, a Duration field, an RA (Receiving Address) field, a TA (Transmitting Address) field, a Sounding Dialog Token field, an STA Info 1 field through STA info n field, and an FCS.

The RA field value indicates the address of a receiver or STA which receives the VHT NDPA frame.

If the VHT NDPA frame includes only one STA Info field, then the RA field is set to the address of the STA identified by the AID in the STA Info field. For example, when transmitting the VHT NDPA frame to one target STA for SU-MIMO channel sounding, an AP unicasts the VHT NDPA frame to the target STA.

On the other hand, if the VHT NDPA frame includes more than one STA Info field, then the RA field is set to the broadcast address. For example, when transmitting the VHT NDPA frame to at least one target STA for MU-MIMO channel sounding, an AP broadcasts the VHT NDPA frame.

The TA field value indicates the address of a transmitter or transmitting STA which transmits the VHT NDPA frame or a bandwidth signaling TA.

The Sounding Dialog Token field also may be called a Sounding Sequence field. The Sounding Dialog Token Number subfield in the Sounding Dialog Token field contains a value selected by the beamformer to identify the VHT NDPA frame.

The VHT NDPA frame includes at least one STA Info field. That is, the VHT NDPA frame includes an STA Info field containing information on target STAs for sounding. One STA Info field may be included for each target STA for sounding.

Each STA Info field may include an AID12 subfield, a Feedback Type subfield, and an NC Index subfield.

Table 6 shows the subfields of an STA Info field included in the VHT NDPA frame.

TABLE 6

| Subfield | Description |
| --- | --- |
| AID12 | Contains the AID of a target STA for sounding feedback. The AID12 subfield value is set to '0' if the target STA is an AP, mesh STA, or STA that is a member of an IBSS. |
| Feedback Type | Indicates the type of feedback requested for the target STA for sounding.<br>Set to 0 for SU-MIMO.<br>Set to 1 for MU-MIMO. |
| Nc Index | If the Feedback Type subfield indicates MU-MIMO, then NcIndex indicates the number of columns, Nc, in the Compressed Beamforming Feedback Matrix subfield minus 1.<br>Set to 0 for Nc = 1,<br>Set to 1 for Nc = 2,<br>. . .<br>Set to 7 for Nc = 8.<br>Reserved if the Feedback Type subfield indicates SU-MIMO. |

Information contained in the above-described fields may be as defined in the IEEE 802.11 system. Also, the above-described fields are examples of the fields that may be included in the MAC frame but not limited to them. That is, the above-described fields may be substituted with other fields or further include additional fields.

FIG. 10 is a diagram illustrating an NDP PPDU in a wireless communication system to which the present invention may be applied.

Referring to FIG. 10, an NDP may have the VHT PPDU format shown previously in FIG. 4, but without the data field. The NDP may be precoded based on a particular precoding matrix and transmitted to a target STA for sounding.

In the L-SIG field of the NDP, the length field indicating the length of a PSDU included in the data field is set to '0'.

In the VHT-SIG-A field of the NDP, the Group ID field indicating whether a transmission technique used for NDP transmission is MU-MIMO or SU-MIMO is set to a value indicating SU-MIMO transmission.

The data bits of the VHT-SIG-B field of the NDP are set to a fixed bit pattern for each bandwidth.

Upon receiving the NDP, the target STA for sounding performs channel estimation and acquires channel state information.

FIG. 11 is a diagram illustrating a VHT compressed beamforming frame format in a wireless communication system to which the present invention may be applied.

Referring to FIG. 11, the VHT compressed beamforming frame is a VHT Action frame for supporting VHT functionality, and its frame body includes an Action field. The Action field is included in the frame body of a MAC frame to provide a mechanism for specifying extended management actions.

The Action field consists of a Category field, a VHT Action field, a VHT MIMO Control field, a VHT Compressed Beamforming Report field, and an MU Exclusive Beamforming Report field.

The Category field is set to a value indicating the VHT category (i.e., VHT Action frame), and the VHT Action field is set to a value indicating the VHT Compressed Beamforming frame.

The VHT MIMO Control field is used to feed back control information related to beamforming feedback. The VHT MIMO Control field may always be present in the VHT Compressed Beamforming frame.

The VHT Compressed Beamforming Report field is used to feed back information on a beamforming matrix containing SNR information for space-time streams used for transmitting data.

The MU Exclusive Beamforming Report field is used to feed back SNR information for spatial streams when performing a MU-MIMO transmission.

The presence and content of the VHT Compressed Beamforming Report field and the MU Exclusive Beamforming Report field are dependent on the values of the Feedback Type, Remaining Feedback Segments, and First Feedback Segment subfields of the VHT MIMO Control field Hereinafter, the VHT MIMO Control field, the VHT Compressed Beamforming Report field, and the MU Exclusive Beamforming Report field may be discussed more concretely.

1) The VHT MIMO Control field consists of an Nc index subfield, an Nr Index subfield, a Channel Width subfield, a Grouping subfield, a Codebook Information subfield, a Feedback type subfield, a Remaining Feedback segments subfield, a First Feedback segment subfield, a reserved subfield, and a Sounding Dialog Token Number field.

Table 7 shows the subfields of the VHT MIMO Control field.

TABLE 7

| Subfield | Bits | Description |
| --- | --- | --- |
| Nc Index | 3 | Indicates the number of columns, Nc, in the compressed beamforming feedback matrix minus 1:<br>Set to 0 for Nc = 1,<br>Set to 1 for Nc = 2,<br>. . .<br>Set to 7 for Nc = 8. |
| Nr Index | 3 | Indicates the number of rows, Nr, in the compressed beamforming feedback matrix minus 1:<br>Set to 0 for Nr = 1,<br>Set to 1 for Nr = 2,<br>. . .<br>Set to 7 for Nr = 8. |
| Channel Width | 2 | Indicates the width of the channel measured to create a compressed beamforming feedback matrix:<br>Set to 0 for 20 MHz,<br>Set to 1 for 40 MHz,<br>Set to 2 for 80 MHz,<br>Set to 3 for 160 MHz or 80 + 80 MHz. |
| Grouping | 2 | Indicates the subcarrier grouping, Ng, used for the compressed beamforming feedback matrix:<br>Set to 0 for Ng = 1 (No grouping),<br>Set to 1 for Ng = 2,<br>Set to 2 for Ng = 4,<br>The value 3 is reserved. |
| Codebook Information | 1 | Indicates the size of codebook entries:<br>If Feedback Type is SU:<br>Set to 0 for $b\Psi = 2$ and $b\Phi = 4$,<br>Set to 1 for $b\Psi = 4$ and $b\Phi = 6$.<br>If Feedback Type is MU:<br>Set to 0 for $b\Psi = 5$ and $b\Phi = 7$<br>Set to 1 for $b\Psi = 7$ and $b\Phi = 9$.<br>Here, $b\Psi$ and $b\Phi$ indicate the number of quantization bits. |

TABLE 7-continued

| Subfield | Bits | Description |
|---|---|---|
| Feedback Type | 1 | Indicates the feedback type:<br>Set to 0 for SU-MIMO,<br>Set to 1 for MU-MIMO. |
| Remaining Feedback Segments | 3 | Indicates the number of remaining feedback segments for the associated VHT Compressed Beamforming frame:<br>Set to 0 for the last feedback segment of a segmented report or the only feedback segment of an unsegmented report.<br>Set to a value between 1 and 6 for a feedback segment that is neither the first nor the last of a segmented report.<br>Set to a value between 1 and 6 for a feedback segment that is not the last feedback segment of a segmented report.<br>In a retransmitted feedback segment, the field is set to the same value as the associated feedback segment in the original transmission. |
| First Feedback Segment | 1 | Set to 1 for the first feedback segment of a segmented report or the only feedback segment of an unsegmented report;<br>Set to 0 if it is not the first feedback segment or if the VHT Compressed Beamforming Report field and MU Exclusive Beamforming Report field are not present in the frame.<br>In a retransmitted feedback segment, the field is set to the same value as the associated feedback segment in the original transmission. |
| Sounding Dialog Token Number | 6 | Set to the value of the sounding dialog token of the NDPA frame. |

In a VHT Compressed Beamforming frame not carrying all or part of the VHT Compressed Beamforming Report field, the Nc Index subfield, Nr Index subfield, Channel Width subfield, Grouping subfield, Codebook Information subfield, Feedback Type subfield, and Sounding Dialog Token Number field are reserved, the First Feedback Segment field is set to 0, and the Remaining Feedback Segments field is set to 7.

The Sounding Dialog Token Number field also may be called a Sounding Sequence Number subfield.

2) The VHT Compressed Beamforming Report field is used to carry explicit feedback information in the form of angles representing compressed beamforming feedback matrices V for use by a transmit beamformer to determine steering matrices Q.

Table 8 shows the subfields of the VHT Compressed Beamforming Report field.

TABLE 8

| Subfield | Bits | Description |
|---|---|---|
| Average SNR of Space-Time Stream 1 | 8 | Signal-to-noise ratio at the beamformee for space-time stream 1 averaged over all subcarriers |
| ... | ... | ... |
| Average SNR of Space-Time Stream Nc | 8 | Signal-to-noise ratio at the beamformee for space-time stream Nc averaged over all subcarriers |
| Compressed Beamforming Feedback Matrix V for subcarrier k = scidx(0) | Na × (b$\Psi$ + b$\Phi$)/2 | Order of angles in the Compressed Beamforming feedback matrix for the corresponding subcarrier |
| Compressed Beamforming Feedback Matrix V for subcarrier k = scidx(1) | Na × (b$\Psi$ + b$\Phi$)/2 | Order of angles in the Compressed Beamforming feedback matrix for the corresponding subcarrier |
| ... | ... | ... |
| Compressed Beamforming Feedback Matrix V for subcarrier k = scidx(Ns − 1) | Na × (b$\Psi$ + b$\Phi$)/2 | Order of angles in the Compressed Beamforming feedback matrix for the corresponding subcarrier |

With reference to Table 8, the VHT compressed beamforming report field may include the average SNR of each space-time stream and a Compressed Beamforming Feedback Matrix V for each subcarrier. The Compressed Beamforming Feedback Matrix is a matrix including information about channel state and can be used to calculate a channel matrix (i.e., steering matrix Q) for an MIMO-based transmission method.

scidx( ) refers to subcarriers which transmit the Compressed Beamfoming Feedback Matrix subfield. Na is fixed by the Nr×Nc value (e.g., Φ11, Ψ21, . . . for Nr×Nc=2×1).

Ns refers to the number of subcarriers which transmit a compressed beamforming feedback matrix to the beamformer. A beamformee, by using a grouping method, can reduce the number of subcarriers Ns which transmit the compressed beamforming feedback matrix. For example, the number of beamforming feedback matrices provided as feedback information can be reduced by grouping a plurality of subcarriers into one group and transmitting a compressed beamforming feedback matrix for the corresponding group. Ns may be calculated from the Channel Width and Grouping subfields in the VHT MIMO Control field.

Table 9 illustrates the average SNR of Space-Time Stream subfield.

TABLE 9

| Average SNR of Space-Time i subfield | AvgSNR_i |
| --- | --- |
| −128 | ≤10 dB |
| −127 | −9.75 dB |
| −126 | −9.5 dB |
| . . . | . . . |
| +126 | 53.5 dB |
| +127 | ≥53.75 dB |

With reference to Table 9, an average SNR for each stream-space stream is obtained by calculating the average SNR of all subcarriers in the corresponding channel and mapping the calculated average SNR into the range of −128 to +128.

3) The MU Exclusive Beamforming Report field is used to carry explicit feedback information in the form of delta ( ) SNRs. The information in the VHT Compressed Beamforming Report field and the MU Exclusive Beamforming Report field can be used by an MU beamformer to determine steering matrices Q.

Table 10 shows the subfields of the MU Exclusive Beamforming Report field included in a VHT compressed beamforming frame.

TABLE 10

| Subfield | Bits | Description |
| --- | --- | --- |
| Delta SNR for space-time stream 1 for subcarrier k = sscidx(0) | 4 | The deviation between the SNR of the corresponding subcarrier and the average SNR of all subcarriers for the corresponding space-time stream. |
| . . . | . . . | . . . |
| Delta SNR for space-time stream Nc for subcarrier k = sscidx(0) | 4 | The deviation between the SNR of the corresponding subcarrier and the average SNR of all subcarriers for the corresponding space-time stream. |
| . . . | . . . | . . . |
| Delta SNR for space-time stream 1 for subcarrier k = sscidx(1) | 4 | The deviation between the SNR of the corresponding subcarrier and the average SNR of all subcarriers for the corresponding space-time stream. |
| . . . | . . . | . . . |
| Delta SNR for space-time stream Nc for subcarrier k = sscidx(1) | 4 | The deviation between the SNR of the corresponding subcarrier and the average SNR of all subcarriers for the corresponding space-time stream. |
| . . . | . . . | . . . |
| Delta SNR for space-time stream 1 for subcarrier k = sscidx(Ns' − 1) | 4 | The deviation between the SNR of the corresponding subcarrier and the average SNR of all subcarriers for the corresponding space-time stream. |
| . . . | . . . | . . . |
| Delta SNR for space-time stream Nc for subcarrier k = sscidx(Ns' − 1) | 4 | The deviation between the SNR of the corresponding subcarrier and the average SNR of all subcarriers for the corresponding space-time stream. |

With reference to Table 10, the MU Exclusive Beamforming Report field may include an SNR for each space-time stream for each subcarrier.

Each Delta SNR subfield has a value which is in the range −8 dB to 7 dB in 1 dB increments.

scidx( ) refers to subcarrier(s) which transmit the Delta SNR subfield. Ns refers to the number of subcarriers which transmit the Delta SNR subfield to the beamformer.

FIG. 12 is a diagram illustrating a Beamforming Report Poll frame format in a wireless communication system to which the present invention may be applied.

Referring to FIG. 12, the Beamforming Report Poll frame consists of a Frame Control field, a Duration field, an RA (Receiving Address) field, a TA (Transmitting Address) field, a Feedback Segment Retransmission Bitmap field, and an FCS.

The RA field value is the address of the intended recipient.

The TA field value is the address of the STA transmitting the Beamforming Report Poll or a bandwidth signaling TA.

The Feedback Segment Retransmission Bitmap field indicates the requested feedback segments of a VHT Compressed Beamforming report.

If the bit in position n (n=0 for LSB and n=7 for MSB) is 1, then the feedback segment with the Remaining Feedback Segments subfield in the VHT MIMO Control field equal to n is requested. If the bit in position n is 0, then the feedback segment with the Remaining Feedback Segments subfield in the VHT MIMO Control field equal to n is not requested.

Downlink (DL) MU-MIMO Frame

FIG. 13 is a diagram illustrating a DL multi-user (MU) PPDU format in a wireless communication system to which an embodiment of the present invention may be applied.

Referring to FIG. 13, the PPDU is configured to include a physical preamble and a data field. The data field may include a service field, a scrambled PSDU field, tail bits, and padding bits.

An AP may aggregate MPDUs and transmit a data frame using an aggregated MPDU (A-MPDU) format. In this case, a scrambled PSDU field may include the A-MPDU.

The A-MPDU includes a sequence of one or more A-MPDU subframes.

In the case of a VHT PPDU, the length of each A-MPDU subframe is a multiple of 4 octets. Accordingly, an A-MPDU may include an end-of-frame (EOF) pad of 0 to 3 octets after the last A-MPDU subframe in order to match the A-MPDU up with the last octet of a PSDU.

The A-MPDU subframe includes an MPDU delimiter, and an MPDU may be optionally included after the MPDU delimiter. Furthermore, a pad octet is attached to the MPDU in order to make the length of each A-MPDU subframe in a multiple of 4 octets other than the last A-MPDU subframe within one A-MPDU.

The MPDU delimiter includes a reserved field, an MPDU length field, a cyclic redundancy check (CRC) field, and a delimiter signature field.

In the case of a VHT PPDU, the MPDU delimiter may further include an end-of-frame (EOF) field. If an MPDU length field is 0 and an A-MPDU subframe or A-MPDU used for padding includes only one MPDU, in the case of an A-MPDU subframe on which a corresponding MPDU is carried, the EOF field is set to "1." If not, the EOF field is set to "0."

The MPDU length field includes information about the length of the MPDU.

If an MPDU is not present in a corresponding A-MPDU subframe, the PDU length field is set to "0." An A-MPDU subframe in which an MPDU length field has a value of "0" is used to be padded to a corresponding A-MPDU in order to match the A-MPDU up with available octets within a VHT PPDU.

The CRC field includes CRC information for an error check. The delimiter signature field includes pattern information used to search for an MPDU delimiter.

Furthermore, the MPDU includes an MAC header, a frame body, and a frame check sequence (FCS).

FIG. 14 is a diagram illustrating a DL multi-user (MU) PPDU format in a wireless communication system to which an embodiment of the present invention may be applied.

In FIG. 14, the number of STAs receiving a corresponding PPDU is assumed to be 3 and the number of spatial streams allocated to each STA is assumed to be 1, but the number of STAs paired with an AP and the number of spatial streams allocated to each STA are not limited thereto.

Referring to FIG. 14, the MU PPDU is configured to include L-TFs (i.e., an L-STF and an L-LTF), an L-SIG field, a VHT-SIG-A field, a VHT-TFs (i.e., a VHT-STF and a VHT-LTF), a VHT-SIG-B field, a service field, one or more PSDUs, a padding field, and a tail bit. The L-TFs, the L-SIG field, the VHT-SIG-A field, the VHT-TFs, and the VHT-SIG-B field are the same as those of FIG. 4, and a detailed description thereof is omitted.

Information for indicating PPDU duration may be included in the L-SIG field. In the PPDU, PPDU duration indicated by the L-SIG field includes a symbol to which the VHT-SIG-A field has been allocated, a symbol to which the VHT-TFs have been allocated, a field to which the VHT-SIG-B field has been allocated, bits forming the service field, bits forming a PSDU, bits forming the padding field, and bits forming the tail field. An STA receiving the PPDU may obtain information about the duration of the PPDU through information indicating the duration of the PPDU included in the L-SIG field.

As described above, group ID information and time and spatial stream number information for each user are transmitted through the VHT-SIG-A, and a coding method and MCS information are transmitted through the VHT-SIG-B. Accordingly, beamformees may check the VHT-SIG-A and the VHT-SIG-B and may be aware whether a frame is an MU MIMO frame to which the beamformee belongs. Accordingly, an STA which is not a member STA of a corresponding group ID or which is a member of a corresponding group ID, but in which the number of streams allocated to the STA is "0" is configured to stop the reception of the physical layer to the end of the PPDU from the VHT-SIG-A field, thereby being capable of reducing power consumption.

In the group ID, an STA can be aware that a beamformee belongs to which MU group and it is a user who belongs to the users of a group to which the STA belongs and who is placed at what place, that is, that a PPDU is received through which stream by previously receiving a group ID management frame transmitted by a beamformer.

All of MPDUs transmitted within the VHT MU PPDU based on 802.11ac are included in the A-MPDU. In the data field of FIG. 18, each VHT A-MPDU may be transmitted in a different stream.

In FIG. 14, the A-MPDUs may have different bit sizes because the size of data transmitted to each STA may be different.

In this case, null padding may be performed so that the time when the transmission of a plurality of data frames transmitted by a beamformer is ended is the same as the time when the transmission of a maximum interval transmission data frame is ended. The maximum interval transmission data frame may be a frame in which valid downlink data is transmitted by a beamformer for the longest time. The valid downlink data may be downlink data that has not been null padded. For example, the valid downlink data may be included in the A-MPDU and transmitted. Null padding may be performed on the remaining data frames other than the maximum interval transmission data frame of the plurality of data frames.

For the null padding, a beamformer may fill one or more A-MPDU subframes, temporally placed in the latter part of a plurality of A-MPDU subframes within an A-MPDU frame, with only an MPDU delimiter field through encoding. An A-MPDU subframe having an MPDU length of 0 may be called a null subframe.

As described above, in the null subframe, the EOF field of the MPDU delimiter is set to "1." Accordingly, when the EOF field set to 1 is detected in the MAC layer of an STA on the receiving side, the reception of the physical layer is stopped, thereby being capable of reducing power consumption.

Block Ack Procedure

FIG. 15 is a diagram illustrating a downlink MU-MIMO transmission process in a wireless communication system to which the present invention may be applied.

MU-MIMO in 802.11ac works only in the downlink direction from the AP to clients. A multi-user frame can be transmitted to multiple receivers at the same time, but the acknowledgements must be transmitted individually in the uplink direction.

Every MPDU transmitted in a VHT MU PPDU based on 802.11ac is included in an A-MPDU, so responses to A-MPDUs within the VHT MU PPDU that are not immediate responses to the VHT MU PPDU are transmitted in response to BAR (Block Ack Request) frames by the AP.

To begin with, the AP transmits a VHT MU PPDU (i.e., a physical preamble and data) to every receiver (i.e., STA 1, STA 2, and STA 3). The VHT MU PPDU includes VHT A-MPDUs that are to be transmitted to each STA.

Having received the VHT MU PPDU from the AP, STA 1 transmits a BA (Block Acknowledgement) frame to the AP after an SIFS. A more detailed description of the BA frame will be described later.

Having received the BA from STA 1, the AP transmits a BAR (block acknowledgement request) frame to STA 2 after an SIFS, and STA 2 transmits a BA frame to the AP after an SIFS. Having received the BA frame from STA 2, the AP transmits a BAR frame to STA 3 after an SIFS, and STA 3 transmits a BA frame to the AP after an SIFS.

When this process is performed all STAs, the AP transmits the next MU PPDU to all the STAs.

ACK (Acknowledgement)/Block ACK Frames

In general, an ACK frame is used as a response to an MPDU, and a block ACK frame is used as a response to an A-MPDU.

FIG. 16 is a diagram illustrating an ACK frame in a wireless communication system to which the present invention may be applied.

Referring to FIG. 16, the ACK frame consists of a Frame Control field, a Duration field, an RA field, and a FCS.

The RA field is set to the value of the Address 2 field of the immediately preceding Data frame, Management frame, Block Ack Request frame, Block Ack frame, or PS-Poll frame.

For ACK frames sent by non-QoS STAs, if the More Fragments subfield is set to 0 in the Frame Control field of the immediately preceding Data or Management frame, the duration value is set to 0.

For ACK frames not sent by non-QoS STAs, the duration value is set to the value obtained from the Duration/ID field of the immediately preceding Data, Management, PS-Poll, BlockAckReq, or BlockAck frame minus the time, in microseconds, required to transmit the ACK frame and its SIFS interval. If the calculated duration includes a fractional microsecond, that value is rounded up to the next higher integer.

Hereinafter, the Block Ack Request frame will be discussed.

FIG. 17 is a diagram illustrating a Block Ack Request frame in a wireless communication system to which the present invention may be applied.

Referring to FIG. 17, the Block Ack Request frame consists of a Frame Control field, a Duration/ID field, an RA field, a TA field, a BAR Control field, a BAR Information field, and a frame check sequence (FCS).

The RA field may be set to the address of the STA receiving the BAR frame.

The TA field may be set to the address of the STA transmitting the BAR frame.

The BAR Control field includes a BAR Ack Policy subfield, a Multi-TID subfield, a Compressed Bitmap subfield, a Reserved subfield, and a TID_Info subfield.

Table 11 shows the BAR Control field.

The BAR Information field contains different information depending on the type of the BAR frame. This will be described with reference to FIG. 18.

FIG. 18 is a diagram illustrating the BAR Information field of a Block Ack Request frame in a wireless communication system to which the present invention may be applied.

FIG. 18(a) illustrates the BAR Information field of Basic BAR and Compressed BAR frames, and 22(b) illustrates the BAR Information field of a Multi-TID BAR frame.

Referring to 18(a), for the Basic BAR and Compressed BAR frames, the BAR Information field includes a Block Ack Starting Sequence Control subfield.

The Block Ack Starting Sequence Control subfield includes a Fragment Number subfield and a Starting Sequence Number subfield.

The Fragment Number subfield is set to 0.

For the Basic BAR frame, the Starting Sequence Number subfield contains the sequence number of the first MSDU for which the corresponding BAR frame is sent. For the Compressed BAR frame, the Starting Sequence Control subfield contains the sequence number of the first MSDU or A-MSDU for which the corresponding BAR frame is sent.

Referring to 18(b), for the Multi-TID BAR frame, the BAR Information field includes a Per TID Info subfield and a Block Ack Starting Sequence Control subfield, which are repeated for each TID.

The Per TID Info subfield includes a Reserved subfield and a TID Value subfield. The TID Value subfield contains a TID value.

As described above, the Block Ack Starting Sequence Control subfield includes fragment Number and Starting Sequence Number subfields. The Fragment Number subfield is set to 0. The Starting Sequence Control subfield contains the sequence number of the first MSDU or A-MSDU for which the corresponding BAR frame is sent.

FIG. 19 is a diagram illustrating a Block Ack frame in a wireless communication system to which the present invention may be applied.

Referring to FIG. 19, the Block Ack (BA) frame consists of a Frame Control field, a Duration/ID field, an RA field, a TA field, a BA Control field, a BA Information field, and a Frame Check Sequence (FCS).

The RA field may be set to the address of the STA requesting the BA frame.

TABLE 11

| Subfield | Bits | Description |
| --- | --- | --- |
| BAR Ack Policy | 1 | Set to 0 when the sender requires immediate ACK of a data transmission. Set to 1 when the sender does not require immediate ACK of a data transmission. |
| Multi-TID | 1 | Indicates the type of the BAR frame depending on the |
| Compressed Bitmap | 1 | values of the Multi-TID subfield and Compressed Bitmap subfield. 00: Basic BAR 01: Compressed BAR 10: Reserved 11: Multi-TID BAR |
| Reserved | 9 | |
| TID_Info | 4 | The meaning of the TID_Info field depends on the type of the BAR frame. For a Basic BAR frame and a Compressed BAR frame, this subfield contains information on TIDs for which a BA frame is required. For a Multi-TID BAR frame, this subfield contains the number of TIDs. |

The TA field may be set to the address of the STA transmitting the BA frame.

The BA Control field includes a BA Ack Policy subfield, a Multi-TID subfield, a Compressed Bitmap subfield, a Reserved subfield, and a TID_Info subfield.

Table 12 shows the BA Control field.

TABLE 12

| Subfield | Bits | Description |
| --- | --- | --- |
| BA Ack Policy | 1 | Set to 0 when the sender requires immediate ACK of a data transmission.<br>Set to 1 when the sender does not require immediate ACK of a data transmission. |
| Multi-TID | 1 | Indicates the type of the BA frame depending on the values of the Multi-TID subfield and Compressed Bitmap subfield.<br>00: Basic BA<br>01: Compressed BA<br>10: Reserved<br>11: Multi-TID BA |
| Compressed Bitmap | 1 | |
| Reserved | 9 | |
| TID_Info | 4 | The meaning of the TID_Info field depends on the type of the BA frame.<br>For a Basic BA frame and a Compressed BA frame, this subfield contains information on TIDs for which a BA frame is required.<br>For a Multi-TID BA frame, this subfield contains the number of TIDs. |

The BA Information field contains different information depending on the type of the BA frame. This will be described with reference to FIG. 20.

FIG. 20 is a diagram illustrating the BA Information field of a Block Ack frame in a wireless communication system to which the present invention may be applied.

FIG. 20(a) illustrates the BA Information field of a Basic BA frame, FIG. 20(b) illustrates the BA Information field of a Compressed BAR frame, and FIG. 20(c) illustrates the BA Information field of a Multi-TID BA frame.

Referring to FIG. 20(a), for the Basic BA frame, the BA Information field includes a Block Ack Starting Sequence Control subfield and a Block Ack Bitmap subfield.

As described above, the Block Ack Starting Sequence Control subfield includes a Fragment Number subfield and a Starting Sequence Number subfield.

The Fragment Number subfield is set to 0.

The Starting Sequence Number subfield contains the sequence number of the first MSDU for which the corresponding BA frame is sent, and is set to the same value as the immediately preceding Basic BAR frame.

The Block Ack Bitmap subfield is 128 octets in length and is used to indicate the received status of a maximum of 64 MSDUs. If a bit of the Block Ack Bitmap subfield has a value of '1', it indicates the successful reception of a single MSDU corresponding to that bit position, and if a bit of the Block Ack Bitmap subfield has a value of '0', it indicates the unsuccessful reception of a single MSDU corresponding to that bit position.

Referring to FIG. 20(b), for the Compressed BA frame, the BA Information field includes a Block Ack Starting Sequence Control subfield and a Block Ack Bitmap subfield.

As described above, the Block Ack Starting Sequence Control subfield includes a Fragment Number subfield and a Starting Sequence Number subfield.

The Fragment Number subfield is set to 0.

The Starting Sequence Number subfield contains the sequence number of the first MSDU or A-MSDU for which the corresponding BA frame is sent, and is set to the same value as the immediately preceding Basic BAR frame.

The Block Ack Bitmap subfield is 8 octets in length and is used to indicate the received status of a maximum of 64 MSDUs and A-MSDU. If a bit of the Block Ack Bitmap subfield has a value of '1', it indicates the successful reception of a single MSDU or A-MSDU corresponding to that bit position, and if a bit of the Block Ack Bitmap subfield has a value of '0', it indicates the unsuccessful reception of a single MSDU or A-MSDU corresponding to that bit position.

Referring to FIG. 20(c), for the Multi-TID BA frame, the BA Information field includes a Per TID Info subfield and a Block Ack Starting Sequence Control subfield, which are repeated for each TID in order of increasing TID.

The Per TID Info subfield includes a Reserved subfield and a TID Value subfield. The TID Value subfield contains a TID value.

As described above, the Block Ack Starting Sequence Control subfield includes fragment Number and Starting Sequence Number subfields. The Fragment Number subfield is set to 0. The Starting Sequence Control subfield contains the sequence number of the first MSDU or A-MSDU for which the corresponding BA frame is sent.

The Block Ack Bitmap subfield is 8 octets in length. If a bit of the Block Ack Bitmap subfield has a value of '1', it indicates the successful reception of a single MSDU or A-MSDU corresponding to that bit position, and if a bit of the Block Ack Bitmap subfield has a value of '0', it indicates the unsuccessful reception of a single MSDU or A-MSDU corresponding to that bit position.

UL Multiple User (MU) Transmission Method

A new frame format and numerology for an 802.11ax system, that is, the next-generation WLAN system, are actively discussed in the situation in which vendors of various fields have lots of interests in the next-generation Wi-Fi and a demand for high throughput and quality of experience (QoE) performance improvement are increased after 802.11ac.

IEEE 802.11ax is one of WLAN systems recently and newly proposed as the next-generation WLAN systems for supporting a higher data rate and processing a higher user load, and is also called a so-called high efficiency WLAN (HEW).

An IEEE 802.11ax WLAN system may operate in a 2.4 GHz frequency band and a 5 GHz frequency band like the existing WLAN systems. Furthermore, the IEEE 802.11ax WLAN system may also operate in a higher 60 GHz frequency band.

In the IEEE 802.11ax system, an FFT size four times larger than that of the existing IEEE 802.11 OFDM systems (e.g., IEEE 802.11a, 802.11n, and 802.11ac) may be used in each bandwidth for average throughput enhancement and outdoor robust transmission for inter-symbol interference. This is described below with reference to related drawings.

Hereinafter, in a description of an HE format PPDU according to an embodiment of the present invention, the descriptions of the aforementioned non-HT format PPDU, HT mixed format PPDU, HT-green field format PPDU and/or VHT format PPDU may be reflected into the description of the HE format PPDU although they are not described otherwise.

FIG. 21 is a diagram illustrating a HE format PPDU according to an embodiment of the present invention.

FIG. 21 illustrates a PPDU format when 80 MHz is allocated to one STA (or OFDMA resource units are allocated to multiple STAs within 80 MHz) or when different streams of 80 MHz are allocated to multiple STAs, respectively.

Referring to FIG. 21, an L-STF, an L-LTF, and an L-SIG may be transmitted an OFDM symbol generated on the basis of 64 FFT points (or 64 subcarriers) in each 20 MHz channel.

A HE-SIG-A field may include common control information commonly received by STAs which receive a PPDU. The HE-SIG-A field may be transmitted in 1 to 3 OFDM symbols. The HE-SIG-A field is duplicated for each 20 MHz and contains the same information. Also, the HE-SIG-A field indicates full bandwidth information of the system.

Table 13 illustrates information contained in the HE-SIG-A field.

The HE-SIG-B field may include user-specific information that is required for each STA to receive its own data (i.e., a Physical Layer Service Data Unit (PSDU)). The HE-SIG-B field may be transmitted in one or two OFDM symbols. For example, the HE-SIG-B field may include information about the length of a corresponding PSDU and the Modulation and Coding Scheme (MCS) of the corresponding PSDU.

The L-STF field, the L-LTF field, the L-SIG field, and the HE-SIG-A field may be duplicately transmitted every 20 MHz channel. For example, when a PPDU is transmitted through four 20 MHz channels, the L-STF field, the L-LTF field, L-STG field, and the HE-SIG-A field may be duplicately transmitted every 20 MHz channel.

If the FFT size is increased, a legacy STA that supports conventional IEEE 802.11a/g/n/ac may be unable to decode a corresponding PPDU. For coexistence between a legacy STA and a HE STA, the L-STF, L-LTF, and L-SIG fields are transmitted through 64 FFT in a 20 MHz channel so that they can be received by a legacy STA. For example, the L-SIG field may occupy a single OFDM symbol, a single OFDM symbol time may be 4 μs and a GI may be 0.8 μs.

The HE-STF field is used to improve AGC estimation in MIMO transmission.

An FFT size per unit frequency may be further increased from the HE-STF (or from the HE-SIG-A). For example, 256 FFT may be used in a 20 MHz channel, 512 FFT may be used in a 40 MHz channel, and 1024 FFT may be used in an 80 MHz channel. If the FFT size is increased, the number of OFDM subcarriers per unit frequency is increased because spacing between OFDM subcarriers is reduced, but an OFDM symbol time may be increased. In order to improve system efficiency, the length of a GI after the HE-STF may be set equal to the length of the GI of the HE-SIG-A.

The HE-SIG-A field includes information that is required for a HE STA to decode a HE PPDU. However, the HE-

TABLE 13

| Field | Bits | Description |
| --- | --- | --- |
| Bandwidth | 2 | Indicates a bandwidth in which a PPDU is transmitted. For example, 20 MHz, 40 MHz, 80 MHz or 160 MHz |
| Group ID | 6 | Indicates an STA or a group of STAs that will receive a PPDU |
| Stream information | 12 | Indicates the number or location of spatial streams for each STA or the number or location of spatial streams for a group of STAs |
| UL indication | 1 | Indicates whether a PPDU is destined to an AP (uplink) or STA (downlink) |
| MU indication | 1 | Indicates whether a PPDU is an SU-MIMO PPDU or an MU-MIMO PPDU |
| GI indication | 1 | Indicates whether a short GI or a long GI is used |
| Allocation information | 12 | Indicates a band or a channel (subchannel index or subband index) allocated to each STA in a bandwidth in which a PPDU is transmitted |
| Transmission power | 12 | Indicates a transmission power for each channel or each STA |

Information contained in each of the fields illustrated in Table 12 may be as defined in the IEEE 802.11 system. Also, the above-described fields are examples of the fields that may be included in the PPDU but not limited to them. That is, the above-described fields may be substituted with other fields or further include additional fields, and not all of the fields may be necessarily included. Another embodiment of the information included in the HE-SIG A field will be described below with reference to FIG. 34.

SIG-A field may be transmitted through 64 FFT in a 20 MHz channel so that it may be received by both a legacy STA and a HE STA. The reason for this is that a HE STA is capable of receiving conventional HT/VHT format PPDUs in addition to a HE format PPDU. In this case, it is required that a legacy STA and a HE STA distinguish a HE format PPDU from an HT/VHT format PPDU, and vice versa.

FIG. 22 is a diagram illustrating a HE format PPDU according to an embodiment of the present invention.

In FIG. 22, it is assumed that 20 MHz channels are allocated to different STAs (e.g., STA 1, STA 2, STA 3 and STA 4), respectively.

Referring to FIG. 22, an FFT size per unit frequency may be further increased after a HE-STF (or HE-SIG-B). For example, after the HE-STF (or HE-SIG-B), 256 FFTs may be used in 20 MHz channel, 512 FFTs may be used in 40 MHz channel, and 1024 FFTs may be used in 80 MHz channel.

Information transmitted in each of the fields in a PPDU is the same as illustrated in FIG. 26 above, so its description will be omitted.

The HE-SIG-B field contains information specific to each STA, but is encoded over the entire band (that is, indicated by the HE-SIG-A field). That is, the HE-SIG-B field contains information on all STAs and is received by all the STAs.

The HE-SIG-B field may indicate information on a frequency bandwidth allocated to each STA and/or stream information for the corresponding frequency bandwidth. For example, in the HE-SIG-B of FIG. 22, a first 20 MHz bandwidth may be allocated to STA 1, a second 20 MHz bandwidth may be allocated to STA 2, a third 20 MHz bandwidth may be allocated to STA 3, and a fourth 20 MHz bandwidth may be allocated to STA 4. Also, a first 40 MHz bandwidth may be allocated to STA 1 and STA 2, and a second 40 MHz bandwidth may be allocated to STA 3 and STA 4. In this case, different streams may be allocated to STA 1 and STA 2, and different streams may be allocated to STA 3 and STA 4.

Moreover, a HE-SIG C field may be defined and added to what is illustrated in FIG. 22. In this case, in the HE-SIG-B field, information on all STAs is transmitted over the entire bandwidth, and control information specific to each STA may be transmitted every 20 MHz.

In addition, differently from the FIG. 21 to FIG. 23, the HE-SIG-B field may not be transmitted throughout the entire band, but may be transmitted in a unit of 20 MHz as the same as the HE-SIG-A field. This will be described in more detail with reference to the drawings below.

FIG. 23 is a diagram illustrating a HE format PPDU according to an embodiment of the present invention.

In FIG. 23, it is assumed that 20 MHz channels are allocated to different STAs (e.g., STA 1, STA 2, STA 3, and STA 4), respectively.

Referring to FIG. 23, the HE-SIG-B field is not transmitted in the entire bands but is transmitted in 20 MHz unit, like the HE-SIG-A field. Here, however, unlike the HE-SIG-A field, the HE-SIG-B field may be encoded in 20 MHz unit and transmitted but may not be duplicated in 20 MHz unit and transmitted.

In this case, an FFT size per unit frequency may be further increased after the HE-STF (or the HE-SIG-B). For example, after the HE-STF (or HE-SIG-B), 256 FFTs may be used in the 20 MHz channel, 512 FFTs may be used in the 40 MHz channel, and 1024 FFTs may be used in the 80 MHz channel.

The information transmitted in each field included in the PPDU is the same as the example of FIG. 21, and thus, descriptions thereof will be omitted.

The HE-SIG-A field is duplicated in 20 MHz unit and transmitted.

The HE-SIG-B field may provide frequency bandwidth information allocated to each STA and/or stream information in a corresponding frequency band. Since the HE-SIG-B field includes information regarding each STA, information regarding each STA may be included for each HE-SIG-B field of 20 MHz units. Here, in the example of FIG. 29, 20 MHz is allocated to each STA, but, in a case in which 40 MHz is allocated to an STA, the HE-SIG-B may be duplicated in 20 MHz unit and transmitted.

In a case where a partial bandwidth having a low level of interference from an adjacent BSS is allocated to an STA in a situation in which each BSS supports different bandwidths, the HE-SIG-B is preferably not transmitted in the entire bands as mentioned above.

Hereinafter, the HE format PPDU of FIG. 23 will be described for the convenience of description.

In FIGS. 21 to 23, a data field, as payload, may include a service field, a scrambled PSDU, a tail bit, and a padding bit.

A Multi-User UL Transmission Method

A method of transmitting, by an AP operating in a WLAN system, data to a plurality of STAs on the same time resource may be called downlink multi-user (DL MU) transmission. In contrast, a method of transmitting, by a plurality of STAs operating in a WLAN system, data to an AP on the same time resource may be called uplink multi-user (UL MU) transmission.

Such DL MU transmission or UL MU transmission may be multiplexed on a frequency domain or a space domain.

If DL MU transmission or UL MU transmission is multiplexed on the frequency domain, different frequency resources (e.g., subcarriers or tones) may be allocated to each of a plurality of STAs as DL or UL resources based on orthogonal frequency division multiplexing (OFDMA). A transmission method through different frequency resources in such the same time resources may be called "DL/UL MU OFDMA transmission."

If DL MU transmission or UL MU transmission is multiplexed on the space domain, different spatial streams may be allocated to each of a plurality of STAs as DL or UL resources. A transmission method through different spatial streams on such the same time resources may be called "DL/UL MU MIMO transmission."

Current WLAN systems do not support UL MU transmission due to the following constraints.

Current WLAN systems do not support synchronization for the transmission timing of UL data transmitted by a plurality of STAs. For example, assuming that a plurality of STAs transmits UL data through the same time resources in the existing WLAN system, in the present WLAN systems, each of a plurality of STAs is unaware of the transmission timing of UL data of another STA. Accordingly, an AP may not receive UL data from each of a plurality of STAs on the same time resource.

Furthermore, in the present WLAN systems, overlap may occur between frequency resources used by a plurality of STAs in order to transmit UL data. For example, if a plurality of STAs has different oscillators, frequency offsets may be different. If a plurality of STAs having different frequency offsets performs UL transmission at the same time through different frequency resources, frequency regions used by a plurality of STAs may partially overlap.

Furthermore, in existing WLAN systems, power control is not performed on each of a plurality of STAs. An AP dependent on the distance between each of a plurality of STAs and the AP and a channel environment may receive signals of different power from a plurality of STAs. In this case, a signal having weak power may not be relatively detected by the AP compared to a signal having strong power.

Accordingly, an embodiment of the present invention proposes an UL MU transmission method in a WLAN system.

FIG. 24 is a diagram illustrating an uplink multi-user transmission procedure according to an embodiment of the present invention.

Referring to FIG. 24, an AP may instruct STAs participating in UL MU transmission to prepare for UL MU transmission, receive an UL MU data frame from these STAs, and send an ACK frame (BA (Block Ack) frame) in response to the UL MU data frame.

First of all, the AP instructs STAs that will transmit UL MU data to prepare for UL MU transmission by sending an UL MU Trigger frame 2410. Here, the term UL MU scheduling frame may be called "UL MU scheduling frame".

Here, the UL MU Trigger frame 2410 may contain control information such as STA ID (identifier)/address information, information on the allocation of resources to be used by each STA, and duration information.

The STA ID/address information refers to information on the identifier or address for specifying an STA that transmits uplink data.

The resource allocation information refers to information on uplink transmission resources allocated to each STA (e.g., information on frequency/subcarriers allocated to each STA in the case of UL MU OFDMA transmission and a stream index allocated to each STA in the case of UL MU MIMO transmission).

The duration information refers to information for determining time resources for transmitting an uplink data frame sent by each of multiple STAs.

For example, the duration information may include period information of a TXOP (Transmit Opportunity) allocated for uplink transmission of each STA or information (e.g., bits or symbols) on the uplink frame length.

Also, the UL MU Trigger frame 2410 may further include control information such as information on an MCS to be used when each STA sends an UL MU data frame, coding information, etc.

The above-mentioned control information may be transmitted in a HE-part (e.g., the HE-SIG-A field or HE-SIG-B field) of a PPDU for delivering the UL MU Trigger frame 2410 or in the control field of the UL MU Trigger frame 2410 (e.g., the Frame Control field of the MAC frame).

The PPDU for delivering the UL MU Trigger frame 2410 starts with an L-part (e.g., the L-STF field, L-LTF field, and L-SIG field). Accordingly, legacy STAs may set their NAV (Network Allocation Vector) by L-SIG protection through the L-SIG field. For example, in the L-SIG, legacy STAs may calculate a period for NAV setting (hereinafter, 'L-SIG protection period') based on the data length and data rate. The legacy STAs may determine that there is no data to be transmitted to themselves during the calculated L-SIG protection period.

For example, the L-SIG protection period may be determined as the sum of the value of the MAC Duration field of the UL MU Trigger frame 2410 and the remaining portion after the L-SIG field of the PPDU delivering the UL MU Trigger frame 2410. Accordingly, the L-SIG protection period may be set to a period of time until the transmission of an ACK frame 2430 (or BA frame) transmitted to each STA, depending on the MAC duration value of the UL MU Trigger frame 2410.

Hereinafter, a method of resource allocation to each STA for UL MU transmission will be described in more detail. A field containing control information will be described separately for convenience of explanation, but the present invention is not limited to this.

A first field may indicate UL MU OFDMA transmission and UL MU MIMO transmission in different ways. For example, '0' may indicate UL MU OFDMA transmission, and '1' may indicate UL MU MIMO transmission. The first field may be 1 bit in size.

A second field (e.g., STA ID/address field) indicates the IDs or addresses of STAs that will participate in UL MU transmission. The size of the second field may be obtained by multiplying the number of bits for indicating an STA ID by the number of STAs participating in UL MU. For example, if the second field has 12 bits, the ID/address of each STA may be indicated in 4 bits.

A third field (e.g., resource allocation field) indicates a resource region allocated to each STA for UL MU transmission. Each STA may be sequentially informed of the resource region allocated to it according to the order in the second field.

If the first field has a value of 0, this indicates frequency information (e.g., frequency index, subcarrier index, etc.) for UL MU transmission in the order of STA IDs/addresses in the second field, and if the first field has a value of 1, this indicates MIMO information (e.g., stream index, etc.) for UL MU transmission in the order of STA IDs/addresses in the second field.

In this case, a single STA may be informed of multiple indices (i.e., frequency/subcarrier indices or stream indices). Thus, the third field may be configured by multiplying the number of bits (or which may be configured in a bitmap format) by the number of STAs participating in UL MU transmission.

For example, it is assumed that the second field is set in the order of STA 1, STA 2, . . . , and the third field is set in the order of 2, 2, . . . .

In this case, if the first field is 0, frequency resources may be allocated to STA 1 and STA2, sequentially in the order of higher frequency region (or lower frequency region). In an example, when 20 MHz OFDMA is supported in an 80 MHz band, STA 1 may use a higher (or lower) 40 MHz band and STA 2 may use the subsequent 40 MHz band.

On the other hand, if the first field is 1, streams may be allocated to STA 1 and STA 2, sequentially in the order of higher-order (or lower-order) streams. In this case, a beamforming scheme for each stream may be prescribed, or the third field or fourth field may contain more specific information on the beamforming scheme for each stream.

Each STA sends a UL MU Data frame 2421, 2422, and 2423 to an AP based on the UL MU Trigger frame 2410. That is, each STA may send a UL MU Data frame 2421, 2422, and 2423 to an AP after receiving the UL MU Trigger frame 2410 from the AP.

Each STA may determine particular frequency resources for UL MU OFDMA transmission or spatial streams for UL MU MIMO transmission, based on the resource allocation information in the UL MU Trigger frame 2410.

Specifically, for UL MU OFDMA transmission, each STA may send an uplink data frame on the same time resource through a different frequency resource.

Here, each of STA 1 to STA 3 may be allocated different frequency resources for uplink data frame transmission, based on the STA ID/address information and resource allocation information included in the UL MU Trigger frame 2410. For example, the STA ID/address information may sequentially indicate STA 1 to STA 3, and the resource allocation information may sequentially indicate frequency resource 1, frequency resource 2, and frequency resource 3. In this case, STA 1 to STA 3 sequentially indicated based on the STA ID/address information may be allocated frequency resource 1, frequency resource 2, and frequency resource 3, which are sequentially indicated based on the resource allocation information. That is, STA 1, STA 2, and STA 3 may send the uplink data frame 2421, 2422, and 2423 to the AP through frequency resource 1, frequency resource 2, and frequency resource 3, respectively.

In addition, for UL MU MIMO transmission, each STA may send an uplink data frame on the same time resource through at least one different stream among a plurality of spatial streams.

Here, each of STA 1 to STA 3 may be allocated spatial streams for uplink data frame transmission, based on the STA ID/address information and resource allocation information included in the UL MU Trigger frame 2410. For example, the STA ID/address information may sequentially indicate STA 1 to STA 3, and the resource allocation information may sequentially indicate spatial stream 1, spatial stream 2, and spatial stream 3. In this case, STA 1 to STA 3 sequentially indicated based on the STA ID/address information may be allocated spatial stream 1, spatial stream 2, and spatial stream 3, which are sequentially indicated based on the resource allocation information. That is, STA 1, STA 2, and STA 3 may send the uplink data frame 2421, 2422, and 2423 to the AP through spatial stream 1, spatial stream 2, and spatial stream 3, respectively.

The PPDU for delivering the uplink data frame 2421, 2422, and 2423 may have a new structure, even without an L-part.

For UL MU MIMO transmission or for UL MU OFDMA transmission in a subband below 20 MHz, the L-part of the PPDU for delivering the uplink data frame 2421, 2422, and 2423 may be transmitted on an SFN (that is, all STAs send an L-part having the same configuration and content). On the contrary, for UL MU OFDMA transmission in a subband above 20 MHz, the L-part of the PPDU for delivering the uplink data frame 2421, 2422, and 2423 may be transmitted every 20 MHz.

As long as the information in the UL MU Trigger frame 2410 suffices to construct an uplink data frame, the HE-SIG field (i.e., a part where control information for a data frame configuration scheme is transmitted) in the PPDU delivering the uplink data frame 2421, 2422, and 2423 may not be required. For example, the HE-SIG-A field and/or the HE-SIG-B field may not be transmitted. Also, the HE-SIG-A field and the HE-SIG C field may be transmitted, but the HE-SIG-B field may not be transmitted.

An AP may send an ACK Frame 2430 (or BA frame) in response to the uplink data frame 2421, 2422, and 2423 received from each STA. Here, the AP may receive the uplink data frame 2421, 2422, and 2423 from each STA and then, after an SIFS, transmit the ACK frame 2430 to each STA.

Using the existing ACK frame structure, an RA field having a size of 6 octets may include the AID (or Partial AID) of STAs participating in UL MU transmission.

Alternatively, an ACK frame with a new structure may be configured for DL SU transmission or DL MU transmission.

The AP may send an ACK frame 2430 to an STA only when an UL MU data frame is successfully received by the corresponding STA. Through the ACK frame 2430, the AP may inform whether the reception is successful or not by ACK or NACK. If the ACK frame 2430 contains NACK information, it also may include the reason for NACK or information (e.g., UL MU scheduling information, etc.) for the subsequent procedure.

Alternatively, the PPDU for delivering the ACK frame 2430 may be configured to have a new structure without an L-part.

The ACK frame 2430 may contain STA ID or address information, but the STA ID or address information may be omitted if the order of STAs indicated in the UL MU Trigger frame 2410 also applies to the ACK frame 2430.

Moreover, the TXOP (i.e., L-SIG protection period) of the ACK frame 2430 may be extended, and a frame for the next UL MU scheduling or a control frame containing adjustment information for the next UL MU transmission may be included in the TXOP.

Meanwhile, an adjustment process may be added to synchronize STAs for UL MU transmission.

Resource Allocation Unit

FIGS. 25 to 27 illustrate resource allocation units in an OFDMA multi-user transmission scheme according to an embodiment of the present invention.

When a DL/UL OFDMA transmission scheme is used, a plurality of resource units may be defined in units of n tones (or subcarriers) in a PPDU bandwidth.

A resource unit refers to a frequency resource allocation unit for DL/UL OFDMA transmission.

One or more resource units are allocated per STA as DL/UL resource units such that different resource units may be allocated to a plurality of STAs.

FIG. 25 illustrates a case in which the PPDU bandwidth is 20 MHz.

7 DC tones may be positioned in a center frequency region of the 20 MHz PPDU bandwidth. In addition, 6 left guard tones and 5 right guard tones may be respectively positioned at both sides of the 20 MHz PPDU bandwidth.

According to a resource unit configuration scheme illustrated in FIG. 25(*a*), one resource unit may be composed of 26 tones (26-tone resource unit). Here, 4 leftover tones may neighbor 26-tone resource units in the 20 MHz PPDU bandwidth, as illustrated in FIG. 15(*a*). According to a resource unit configuration scheme illustrated in FIG. 15(*b*), one resource unit may be composed of 52 tones (52-tone resource unit) or 26 tones. Here, 4 leftover tones may neighbor 26-tone/52-tone resource units in the 20 MHz PPDU bandwidth, as illustrated in FIG. 25(*b*). According to a resource unit configuration scheme illustrated in FIG. 25(*c*), one resource unit may be composed of 106 tones (106-tone resource unit) or 26 tones. According to a resource unit configuration scheme illustrated in FIG. 25(*d*), one resource unit may be composed of 242 tones (242-tone resource unit).

When a resource unit is configured as illustrated in FIG. 25(*a*), up to 9 STAs may be supported for DL/UL OFDMA transmission in the 20 MHz band. When a resource unit is configured as illustrated in FIG. 25(*b*), up to 5 STAs may be supported for DL/UL OFDMA transmission in the 20 MHz band. When a resource unit is configured as illustrated in FIG. 25(*c*), up to 3 STAs may be supported for DL/UL OFDMA transmission in the 20 MHz band. When a resource unit is configured as illustrated in FIG. 25(*d*), 20 MHz may be allocated to one STA.

On the basis of the number of STAs participating in DL/UL OFDMA transmission and/or an amount of data transmitted or received by a corresponding STA, any one of the resource unit configuration schemes illustrated in FIGS. 25(*a*) to 25(*d*) may be applied or a combination of the resource unit configuration schemes of FIGS. 25(*a*) to 25(*d*) may be applied.

FIG. 26 illustrates a case in which the PPDU bandwidth is 40 MHz.

5 DC tones may be positioned in a center frequency region of the 40 MHz PPDU bandwidth. In addition, 12 left guard tones and 11 right guard tones may be respectively positioned at both sides of the 40 MHz PPDU bandwidth.

According to a resource unit configuration scheme illustrated in FIG. 26(a), one resource unit may be composed of 26 tones. Here, 16 leftover tones may neighbor 26-tone resource units in the 40 MHz PPDU bandwidth, as illustrated in FIG. 16(a). According to a resource unit configuration scheme illustrated in FIG. 26(b), one resource unit may be composed of 52 tones or 26 tones. Here, 16 leftover tones may neighbor 26-tone/52-tone resource units in the 40 MHz PPDU bandwidth, as illustrated in FIG. 16(b). According to a resource unit configuration scheme illustrated in FIG. 26(c), one resource unit may be composed of 106 tones or 26 tones. Here, 8 leftover tones may neighbor 26-tone/106-tone resource units in the 40 MHz PPDU bandwidth, as illustrated in FIG. 16(c). According to a resource unit configuration scheme illustrated in FIG. 26(d), one resource unit may be composed of 242 tones. According to a resource unit configuration scheme illustrated in FIG. 26(e), one resource unit may be composed of 484 tones.

When a resource unit is configured as illustrated in FIG. 26(a), up to 18 STAs may be supported for DL/UL OFDMA transmission in the 40 MHz band. When a resource unit is configured as illustrated in FIG. 26(b), up to 10 STAs may be supported for DL/UL OFDMA transmission in the 40 MHz band. When a resource unit is configured as illustrated in FIG. 26(c), up to 6 STAs may be supported for DL/UL OFDMA transmission in the 40 MHz band. When a resource unit is configured as illustrated in FIG. 26(d), up to 2 STAs may be supported for DL/UL OFDMA transmission in the 40 MHz band. When a resource unit is configured as illustrated in FIG. 26(e), the resource unit may be allocated to one STA for SU DL/UL transmission in the 40 MHz band.

On the basis of the number of STAs participating in DL/UL OFDMA transmission and/or an amount of data transmitted or received by a corresponding STA, any one of the resource unit configuration schemes illustrated in FIGS. 26(a) to 26(e) may be applied or a combination of the resource unit configuration schemes of FIGS. 26(a) to 26(e) may be applied.

FIG. 27 illustrates a case in which the PPDU bandwidth is 80 MHz.

7 DC tones may be positioned in a center frequency region of the 80 MHz PPDU bandwidth. When the 80 MHz PPDU bandwidth is allocated to one STA (i.e., a resource unit composed of 996 tones is allocated to one STA), however, 5 DC tones may be positioned at the center frequency region. In addition, 12 left guard tones and 11 right guard tones may be respectively positioned at both sides of the 80 MHz PPDU bandwidth.

According to a resource unit configuration scheme illustrated in FIG. 27(a), one resource unit may be composed of 26 tones. Here, 32 leftover tones may neighbor 26-tone resource units in the 80 MHz PPDU bandwidth, as illustrated in FIG. 27(a). According to a resource unit configuration scheme illustrated in FIG. 27(b), one resource unit may be composed of 52 tones or 26 tones. Here, 32 leftover tones may neighbor 26-tone/52-tone resource units in the 80 MHz PPDU bandwidth, as illustrated in FIG. 27(b). According to a resource unit configuration scheme illustrated in FIG. 27(c), one resource unit may be composed of 106 tones or 26 tones. Here, 16 leftover tones may neighbor 26-tone/106-tone resource units in the 80 MHz PPDU bandwidth, as illustrated in FIG. 27(c). According to a resource unit configuration scheme illustrated in FIG. 27(d), one resource unit may be composed of 242 tones or 26 tones. According to a resource unit configuration scheme illustrated in FIG. 27(e), one resource unit may be composed of 484 tones or 26 tones. According to a resource unit configuration scheme illustrated in FIG. 17(f), one resource unit may be composed of 996 tones.

When a resource unit is configured as illustrated in FIG. 27(a), up to 37 STAs may be supported for DL/UL OFDMA transmission in the 80 MHz band. Also, when a resource unit is configured as illustrated in FIG. 27(b), up to 21 STAs may be supported for DL/UL OFDMA transmission in the 80 MHz band. Also, when a resource unit is configured as illustrated in FIG. 27(c), up to 13 STAs may be supported for DL/UL OFDMA transmission in the 80 MHz band. Also, when a resource unit is configured as illustrated in FIG. 27(d), up to 5 STAs may be supported for DL/UL OFDMA transmission in the 80 MHz band. Also, when a resource unit is configured as illustrated in FIG. 27(e), up to 3 STAs may be supported for DL/UL OFDMA transmission in the 80 MHz band. Also, when a resource unit is configured as illustrated in FIG. 27(f), a corresponding resource unit may be allocated to one STA for SU DL/UL transmission in the 80 MHz band.

On the basis of the number of STAs participating in DL/UL OFDMA transmission and/or an amount of data transmitted or received by a corresponding STA, any one of the resource unit configuration schemes illustrated in FIGS. 27(a) to 27(f) may be applied or a combination of the resource unit configuration schemes of FIGS. 27(a) to 27(f) may be applied.

In addition, although not shown, a resource unit configuration scheme in a case where a PPDU bandwidth is 160 MHz may also be proposed. In this case, the 160 MHz PPDU bandwidth may have a structure in which the aforementioned 80 MHz PPDU bandwidth described in FIG. 27 is repeated twice.

Among the entire resource units determined according to the aforementioned resource unit configuration schemes, only some resource units may be used for DL/UL OFDMA transmission. For example, in a case where resource units are configured as illustrated in FIG. 27(a) within 20 MHz, one resource unit is allocated to each of less than 9 STAs and the other resource units may not be allocated to any STA.

In the case of DL OFDMA transmission, a data field of a PPDU is multiplexed in a frequency domain by the resource unit allocated to each STA and transmitted.

Meanwhile, in the case of UL OFDMA transmission, each STA may configure a data field of a PPDU by the resource unit allocated thereto and simultaneously transmit the PPDU to an AP. In this manner, since each STA simultaneously transmits the PPDU, the AP, a receiver, may recognize that the data field of the PPDU transmitted from each STA is multiplexed (or frequency multiplexed) in the frequency domain and transmitted.

Also, in a case where both DL/UL OFDMA transmission and DL/UL MU-MIMO transmission are supported, one resource unit may include a plurality of streams in a spatial domain. Also, one or more streams may be allocated as a DL/UL spatial resource to one STA, and thus, different streams may be allocated to a plurality of STAs.

For example, a resource unit comprised of 106 tones in FIG. 27(c) includes a plurality of streams in the spatial domain to support both DL/UL OFDMA and DL/UL MU-MIMO.

Hereinafter, for convenience of explanation, a resource unit composed of n tones will be referred to as an 'n tone resource unit' (n is a natural number). For example, in the following, a resource unit composed of 26 tones will be referred to as a '26-tone resource unit'.

UL MU ACK Transmission Method

When an AP transmits a DL MU frame to STAs (i.e., when an AP performs a DL MU transmission of a MAC frame to STAs), each of the STAs that receive the DL MU frame may transmit ACK/BA frame to the AP in response to the received DL MU frame. In this case, the STAs may perform a UL SU or UL MU transmission of the ACK/BA frame.

In the case that each of the STAs performs a UL MU transmission of the ACK/BA frame, the trigger information (or scheduling information) for the UL MU transmission of the ACK/BA frame may be required. Here, the trigger information may represent various types of information for the UL MU transmission of the ACK/BA frame which is a response to the data (or MPDU) transmitted through a DL MU data field. Hereinafter, for the convenience of description, the ACK frame and the BA frame are collectively referred to as an 'ACK frame'.

When the ACK frame is transmitted through a UL MU transmission, the ACK frame may be transmitted in two formats as follows. First, the ACK frame may be transmitted through a UL MU transmission through a single UL MU PPDU separately. Second, the ACK frame may be transmitted through a UL MU transmission through a single UL MU PPDU together with a UL data frame (e.g., the ACK frame may be transmitted through a UL MU transmission with being piggybacked in a UL data frame). That is, when a DL MU PPDU and a UL MU PPDU are cascaded, and the UL MU PPDU is consecutively transmitted after a SIFS after the DL MU PPDU is transmitted, the ACK frame may be transmitted through a single UL MU transmission together with a UL data frame. Accordingly, the trigger information for the UL MU transmission of the ACK frame and/or the UL data frame should be included in the DL MU PPDU transmitted before the UL MU PPDU.

FIG. 28 is a diagram illustrating a DL MU PPDU and a UL MU PPDU of a cascade scheme according to an embodiment of the present invention.

Referring to FIG. 28, a DL MU PPDU may include a trigger frame for STAs 1 and 2, and a DL data frame for STAs 3 and 4, and may be transmitted to STAs 1 to 4. In this case, in the trigger frame and the DL data frame received in STAs 1 to 4, the trigger information for a UL MU transmission of STAs 1 to 4 may be included.

STAs 1 and 2 that receive the trigger frame may perform a UL MU transmission of a UL data frame according to the UL MU transmission scheme indicated by the trigger information included in the trigger frame. STA 3 that receives the DL data frame may perform a UL MU transmission of an ACK frame in response to the DL data frame. In this case, STA 3 may perform a UL MU transmission of the ACK frame according to the UL MU transmission scheme indicated by the trigger information included in the trigger frame which is received. STA 4 that receives the DL data frame may perform a UL MU transmission of the ACK frame in response to the received DL data frame together with a UL data frame. In this case, STA 4 may perform a UL MU transmission of the UL data frame and the ACK frame according to the UL MU transmission scheme indicated by the trigger information included in the received DL data frame.

The frames transmitted from STAs 1 to 4 are transmitted through the UL MU transmission simultaneously through a UL MU PPDU.

As such, the ACK frame may be transmitted through a UL MU transmission in various schemes, and the trigger information for the UL MU transmission of the ACK frame is required. Accordingly, hereinafter, a method for efficiently signaling the trigger information for the UL MU transmission of the ACK frame is to be proposed. The description below may also be extendedly applied to a signaling method of the trigger information for the UL MU transmission of the ACK frame and the UL data frame.

In addition, as described above, in response to the DL MU PPDU, the ACK frame may be performed through a UL SU transmission or a UL MU transmission. Accordingly, a UL (SU/MU) transmission rule for determining whether the ACK frame is transmitted with an SU or an MU is also required in advance. For example, in the case that the ACK policy field in the MPDU received through a DL MU PPDU indicates an Implicit BAR, an STA transmits a UL ACK frame after an SIFS after receiving the DL MU PPDU. In this case, in the case that the UL (SU/MU) transmission rule for the UL ACK frame is not predetermined, the STA is unable to know whether to transmit the corresponding UL ACK frame with an SU or an MU.

In addition, although it is assumed that the ACK frame for a DL "MU" PPDU can be UL transmitted only in an "MU", it may be difficult to identify whether the received data frame received in a MAC layer is an SU format or an MU format since there is no separate indicator for indicating whether the corresponding data frame is SU/MU format in the data frame of a DL MU PPDU. Accordingly, a separate indicator for indicating the UL transmission format of the ACK frame is required to be included.

Accordingly, hereinafter, the ACK policy indicating the UL transmission format of the ACK frame for a DL MU PPDU will also be described.

A Signaling Method of Trigger Information for UL ACK Transmission

The signaling method of trigger information for a UL MU transmission of an ACK frame for a DL MU PPDU may be classified into three methods largely as follows.

1. Implicit Signaling method
2. Explicit Signaling method
3. Implicit/Explicit Signaling method Hereinafter, the three methods will be described in more detail.

1. Implicit Signaling Method

An AP may not separately signaling the trigger information (e.g., a UL transport duration and a transport scheme, etc. of an ACK frame) for a UL MU transmission of an ACK frame, and in this case, an STA may perform a UL transmission of the ACK frame by a preconfigured rule.

As an example, an STA may perform a UL transmission of the ACK frame using a resource same as a DL transmission resource of a data field (or MPDU). For example, it may be assumed the case that a data field of a DL MU PPDU is received in STA 1 through the first 26-tone resource unit of 20 MHz channel. In this case, STA 1 may perform a UL MU transmission of the ACK frame in response to the data field, and may perform a UL MU transmission using the same resource as the DL MU transmission resource (the first 26-tone resource unit of 20 MHz channel) of the data field.

As another example, an STA may also perform a UL MU transmission of an ACK frame using the uniform frequency resource as much as transmission channels of a received DL MU PPDU divided by the number of reception STAs. For example, it may be assumed the case that a DL MU PPDU is received in STAs 1 and 2 through 20 MHz channel (including two 106-tone resource unit and one 26-tone resource unit, refer to FIG. 25). In this case, STAs 1 and 2 may perform a UL MU transmission of the ACK frame using the 106-tone resource unit included in the corresponding 20 MHz channel, respectively.

According to the examples described above, when an STA receives a DL SU PPDU, the STA performs a UL SU transmission of an ACK frame through the same channel as the transmission channel of the DL SU PPDU.

For an MCS level applied to an ACK frame, an STA may apply a preconfigured level (e.g., MCS 0), may apply the same level as the MCS level of the received DL PPDU, or may apply a level lower as much as a preconfigured level than the MCS level of the received DL PPDU (e.g., the lower MCS level as much as two levels than the MCS level of the received DL PPDU).

2. Explicit Signaling Method

An AP may perform direct signaling the trigger information for a UL MU transmission of an ACK frame and may transmit it to an STA. The STA that receives it may perform a UL MU transmission of the ACK frame based on the received trigger information. In this case, the AP may perform a DL MU transmission with the trigger information being included in at least one MPDU (hereinafter, referred to as 'DL MPDU') in a data field of a DL MU PPDU. As an example, the AP may transmit the trigger information with being included in (or carried by) a MAC header of a DL MPDU. As another example, the AP may construct a DL MPDU into a trigger frame in which the trigger information is included (or include (or carry) a trigger frame in (on) a DL MPDU) and transmit it. Hereinafter, the examples above will be described in more detail.

(1) The Case that the Trigger Information is Included in (Carried on) a MAC Header The trigger information may be included in a MAC header of a DL MPDU. Particularly, the trigger information may be included in a HE control field in the corresponding MAC header. The HE control field may be newly configured using a control field of the HT format.

The first bit of a HT control field may perform the function as an indicator indicating that the corresponding control field is a VHT control field of the VHT format. For example, in the case that the first bit value of the control field is set to a preconfigured value (e.g., '1'), it is indicated that the corresponding control field is a VHT control field.

Similarly, the second bit (reserved bit) of the HT control field may perform as an indicator indicating that the corresponding control field includes ACK indication information, and is a HE control field which is newly defined in 802.11ax system. For example, in the case that the first bit of the control field indicates the VHT format and the second bit indicates the HE format (or in the case that the second bit is set to a preconfigured value (e.g., '1')), the corresponding control field may correspond to a HE control field.

The trigger information included in a HE control field may include frequency resource allocation information (9 bits) of a sub band unit (a unit of a resource unit) for a UL MU transmission (or OFDMA transmission) of an ACK frame and length information of a UL MU PPDU that carries the corresponding ACK frame. In addition, the trigger information may additionally include an MCS level for a UL MU ACK frame, whether to perform STBC, whether to perform beamforming, an LTF type and/or GI type, and so on. According to an embodiment, a part of the information (e.g., whether to perform STBC, whether to perform beamforming) may be prefixed, and the remaining information may be signaled as trigger information.

The HE control field may include the trigger information for a UL MU transmission of an ACK frame or may include the trigger information for transmitting an ACK frame and a UL data frame. In this case, a separate indicator for distinguishing two types of trigger information may be included in the HE control field. Or, an STA may directly determine whether to perform a UL MU transmission of only an ACK frame or whether to perform a UL MU transmission of a data frame together with an ACK frame depending on a length of a UL MU PPDU which is going to be transmitted.

In the case that the data frame together with the ACK frame are performed through a UL MU transmission, it is preferable that all of various types of information (e.g., information such as an MCS level, whether to perform STBC, whether to perform beamforming, an LTF type and/or GI type, and so on) such as the information included in HE-SIG AB field for a DL data transmission as well as the frequency resource allocation information and a UL MU PPDU are signaled in the HE control field for it.

Although there are many definitions of the HE control field (or although there are various types of HE control field), in the present specification, the HE control field indicates a field to which the trigger information for a MU ACK frame is signaled. For example, although the information such as request/response of Buffer Status information or request/response of channel status information and the like may be included in the HE control field together with the trigger information for a MU ACK frame or in another type of HE control field, in the present specification, the HE control field may be interpreted as a field including the trigger information. Accordingly, in the standard document, it may be represented 'in the case that the HE control field is included and the ACK policy is 'OO' . . . ' or instead of the HE control field, it may be represented 'in the case that the MU ACK transmission information (or trigger information) is included and the ACK policy is 'OO' . . . '.

In addition, the existing HT control field may be included in the Control wrapper frame, the QoS Data frame, the Management frame, and Order bit of a wrapper frame type or a Frame control field may indicate (or notify) whether the HT control field is existed. Similarly, the presence of the HE control field may also be indicated (or notified) in Order bit of a wrapper frame type or a Frame control field.

(2) The Case that the Trigger Information is Included in (Carried on) a Trigger Frame The trigger information may be included in a DL MPDU constructed by (or including) trigger frames. In this case, the trigger information included in the trigger frame is the same as/similar to the trigger information included in a MAC header. Accordingly, the trigger information included in the trigger frame may include the frequency resource allocation information (9 bits) of a sub band unit (a unit of resource unit) for a UL MU transmission (or OFDMA transmission) of an ACK frame and the length information of a UL MU PPDU that carries the corresponding ACK frame. In addition, the trigger information may additionally include an MCS level for a UL MU ACK frame, whether to perform STBC, whether to perform beamforming, an LTF type and/or GI type, and so on. According to an embodiment, a part of the information (e.g., whether to perform STBC, whether to perform beamforming) may be prefixed, and the remaining information may be signaled as trigger information.

The trigger frame may include the trigger information for a UL MU transmission of an ACK frame or may include the trigger information for transmitting an ACK frame and a UL data frame. In this case, a separate indicator for distinguishing two types of trigger information may be included in the trigger frame. Or, an STA may directly determine whether to perform a UL MU transmission of only an ACK frame or whether to perform a UL MU transmission of a data frame together with an ACK frame depending on a length of a UL MU PPDU which is going to be transmitted.

In the case that the data frame together with the ACK frame are transmitted through a UL MU transmission, it is preferable that all of various types of information (e.g., information such as an MCS level, whether to perform STBC, whether to perform beamforming, an LTF type and/or GI type, and so on) such as the information included in HE-SIG AB field for a DL data transmission as well as the frequency resource allocation information and a UL MU PPDU are signaled in the trigger frame for it.

The 2-(1) and 2-(2) methods described above are not exclusively applied, but two methods may be used in mixed manner according to an embodiment. For example, the 2-(1) method may be used as a method of transmitting the trigger information for a UL MU transmission of an ACK frame, and the 2-(2) method may be used as a method of transmitting the trigger information of a UL MU transmission of an ACK frame and a UL data frame.

In the case of the Explicit Signaling method described above, it is required to indicate to an STA that the trigger information is included in a DL MU PPDU and an ACK frame is going to be transmitted as a MU. Accordingly, hereinafter, it is proposed a method of indicating a transmission format of an ACK frame by reusing an ACK policy field of the existing system.

ACK Policy

The present invention proposes a method of utilizing an ACK policy field and a HE control field (and/or trigger frame) in a QoS control field in order to indicate a transmission format of an ACK frame. More particularly, the ACK policy field may indicate the presence of the trigger information for an SU/MU transmission and/or a UL MU transmission of an ACK frame, and the HE control field (and/or trigger frame) may indicate the trigger information for a UL MU transmission of an ACK frame as described above. The method of indicating a transmission format of an ACK frame using the ACK policy field and the HE control field will be described with reference to FIG. 29.

FIG. 29 is a diagram illustrating an ACK policy according to an embodiment of the present invention.

Referring to FIG. 29(a), in a MAC header of all MPDUs (or A-MPDUs) included in a DL data field (data field included in a DL MU PPDU), the HE control field may be included, and the ACK policy field may be set to '00'. In the existing system, when the ACK policy field is '00', the ACK policy field indicates a transmission of a SU ACK frame in the implicit BAR. However, in the present system, when the ACK policy field is '00' and includes the HE control field, the ACK policy field may indicate a "MU" transmission of an ACK frame. Accordingly, an STA that receives a DL data field in which the HE control field is included in all MPDUs and the ACK policy field is set to '00' may perform a UL "MU" transmission of an ACK frame based on the trigger information of the HE control field. This may be represented in the standard document that "in the case that the ACK policy is '00' and the HE control field is included (or in the case that there is an indication for a MU ACK transmission), a UL MU Ack/BA frame is transmitted according to the Explicit Ack Signaling (or trigger information) in the corresponding field".

However, since there is a problem that an overhead increased when the HE control field is included in all MPDU as described in the method of FIG. 29(a), a method shown in FIG. 29(b) is to be proposed.

Referring to FIG. 29(b), the HE control field may be included only in a MAC header of a part of MPDUs (or a part of MPDUs among A-MPDSs) included in a DL data field. However, in the case that an STA is failed to receive a part of MPDUs in which the HE control field is included, the STA is unable to know in which format an ACK frame is going to be transmitted. For example, the reception of the MPDU of which ACK policy field in a QoS control field is '00' and includes the HE control field is failed and the STA does not know the existence of the HE control field, the STA is confused whether to transmit an ACK frame in SU manner or MU manner. In this case, when the STA transmits the ACK frame in SU manner, in the case that another STA transmits an ACK frame in MU manner, a collision occurs between the ACK frames, and thus, all ACK frame transmissions become failed.

In order to prevent such a problem, when the HE control field is included only in a MAC header of a part of MPDUs, the ACK policy field (or ACK policy field value) of all MPDUs included in a DL data field may be set to '01'. In the existing system, when the ACK policy field is '01', PSMP ACK is indicated for a DL data field. Accordingly, by differently interpreting (reusing) it in the present system, the case of which the ACK policy field is '01' may be interpreted that the HE control field including the trigger information in a DL data field is existed (or transmission of a MU ACK frame). That is, in the case that the ACK policy field of the received DL data field is '01', an STA may estimate that the HE control field is existed (or the ACK frame is to be transmitted in the MU format). Accordingly, even in the case that an STA fails to receive the HE control field, the STA may not perform a SU transmission of the ACK frame.

According to the description above, in the case that the ACK policy in a QoS control field of a MPDU included in a received DL MU PPDU is '01', an STA may transmit an ACK frame as an immediate response to the corresponding MPDU (receives a DL MU PPDU, and transmit it after SIFS), but may perform a UL MU transmission of an ACK frame based on the trigger information included in the HE control field (or MAC header). However, in the case that the ACK policy is '01' but an STA fails to receive the HE control field (or MAC header), the STA may not respond it. That is, the STA may not transmit an ACK frame in response to the received DL MU PPDU.

In the standard document, it may be represented that "when the ACK policy is '01' and not PSMP ACK, the HE control field (including the information of a MU Ack transmission) in a part of MPDUs of an A-MPDU, and an STA transmits a UL MU Ack/BA frame according to the Explicit Ack Signaling (or trigger information) in the corresponding field". This representation may be interpreted as a meaning that when the ACK policy is '01' and not PSMP ACK, even in the case that an STA fails to receive the HE control field, the STA does not transmit an ACK frame by estimating SU or implicit signaling.

The description above may be identically applied to the case that the trigger information is transmitted in a form of a trigger frame. That is, the trigger frame may be included only in a part of MPDUs (or a part of MPDUs among A-MPDUs) included in a DL data field (or the trigger frame may be configured as a part of MPDUs included in a DL data field), and the ACK policy field of all MPDUs included in the DL data field may be set to '01'.

Accordingly, in the case that the ACK policy in a QoS control field of a MPDU included in a DL MU PPDU is '01', an STA may transmit an ACK frame as an immediate response to the DL MU PPDU (receives a DL MU PPDU, and transmit it after SIFS), but may perform a UL MU transmission of an ACK frame based on the trigger information included in the trigger frame. However, in the case that the ACK policy of the received DL MU PPDU is '01' or an STA fails to receive the trigger frame, the STA may not respond it. That is, the STA may not transmit an ACK frame in response to the received DL MU PPDU in order to prevent ACK frame collision with another STA.

Referring to FIG. 29(c), as shown in FIG. 29(b), only in the MAC header of a part of MPDUs (or a part of MPDUs among A-MPDUs) included in a DL data field, the HE control field may be included. In this case, the ACK policy field of a part of MPDUs including the HE control field may be set to '00', and the ACK policy field of the remaining MPDUs not including the HE control field may be set to '01'. Accordingly, the STA that receives the corresponding DL data field may identify that the corresponding MPDU does not include that HE control field but other MPDU includes the HE control field through the MPDU in which the ACK policy field set to '01'.

This may be represented in the standard document that "in the case that the ACK policy in a MPDU is '00' and the HE control field indicates a MU ACK frame transmission, an STA transmits a UL MU Ack/BA frame according to the Explicit Ack Signaling (or trigger information) in the corresponding field" and "in the case that the ACK policy in a MPDU is '01' and not PSMP Ack, the HE control field included in other MPDU except the corresponding MPDU indicates a MU ACK frame transmission, and an STA transmits a UL MU Ack/BA frame according to the Explicit Ack Signaling (or trigger information) in the corresponding field". This representation may be interpreted as a meaning that when the ACK policy is '01' and not PSMP ACK, even in the case that an STA fails to receive the HE control field, the STA does not transmit an ACK frame by estimating SU or implicit signaling.

The description above may be identically applied to the case that the trigger information is transmitted in a form of a trigger frame. That is, the trigger frame may be included only in a part of MPDUs (or at least one of MPDUs among A-MPDUs) included in a DL data field (or the trigger frame may be configured as a part of MPDUs included in a DL data field), and the ACK policy field of a part of MPDUs including the trigger frame may be set to '00', and the ACK policy field of the remaining MPDUs not including the trigger frame may be set to '01'.

Accordingly, in the case that the ACK policy of a part of MPDUs included in a DL MU PPDU is '01', an STA may perform a UL MU transmission of an ACK frame based on the trigger information of the trigger frame (other MPDU except the part of MPDUs). However, in the case that the ACK policy of a part of MPDUs included in a DL MU PPDU is '01' or an STA fails to receive the trigger frame, the STA may not respond it. That is, the STA may not transmit an ACK frame in response to the received DL MU PPDU in order to prevent ACK frame collision with another STA.

In FIGS. 29(b) and 29(c), it is illustrated the case that the HE control field (or trigger frame) is included in the first and second MPDUs, but not limited thereto, and the HE control field (or trigger frame) may be included in the MPDU in various positions (or entire MPDUs) in an A-MPDU. That is, an AP may transmit the HE control field (or trigger frame) with being inserted in the MPDU in various positions (or entire MPDUs) in an A-MPDU. For example, since the channel estimation performance is better as it is located near to a physical preamble, in order to protect the HE control field (or trigger frame), an AP may insert the HE control field (or trigger frame) in a part of MPDUs located near to a physical preamble in an A-MPDU (or ahead of an A-MPDU) (e.g., the first to the $n^{th}$ MPDU, n is a natural number). Or, in order to decrease the correlation of channel, an AP may insert the HE control field (or trigger frame) only in the MPDU of odd number (or even number), or may insert the HE control field (or trigger frame) only in the first and the last MPDUs. In addition, considering that the BAR frame is transmitted through the last MPDU of an A-MPDU, an AP may insert the HE control field (or trigger frame) in the last MPDU in the similar way.

Meanwhile, in the case of receiving a MPDU of which ACK policy is set to '11', since an STA is able to transmit a BA frame according to the BAR frame received later, the STA may not take an immediate action after receiving the corresponding MPDU. Like the case of a DL MU PPDU, an STA may receive a SU BAR frame and a MU BAR frame later, and accordingly, the STA may operate by interpreting the frame transmitted by an AP in real time. Therefore, the frames may not be required to be distinguished separately. This may be represented in the standard document as follows.

The addressed recipient takes no action upon the receipt of the frame except for recording the state. The recipient can expect a BlockAckReq/MU-BlockAckReq frame in the future.

So far, the embodiment of reusing the ACK policy field of the QoS control field has been described in order to indicate a transmission format of an ACK frame. However, in addition to the ACK policy field, the transmission format of an ACK frame may be indicated in other field. That is, an AP may instruct to transmit an ACK frame in the MU format using 1 bit of a specific field in a DL PPDU to an STA. In this case, when the received ACK policy field is '00', the STA may transmit a MU ACK frame after SIFS with the Implicit BAR, and when the received ACK policy is '11' the STA may transmit a MU ACK frame according to the received BAR after receiving BAR separately. For example, an AP may instruct to transmit an ACK frame in MU format using 1 bit in Common field of a HE-SIG B field or the reserved 1 bit of Delimiter to an STA. Or, an AP may instruct to transmit an ACK frame in the MU format using a field and so on (e.g., by setting both of ToDS and the FromDS field in the Frame control field to '1', or 1 bit (B12 of AID field) in an Address) that is able to be reinterpreted among various fields in a MAC header to an STA.

Hereinafter, different from the embodiment described above, the ACK policy when the UL SU ACK signaling for a DL MU PPDU is not performed will be described. That is, hereinafter, the ACK policy on whether a UL MU ACK signaling for a DL MU PPDI is performed in implicit method or in explicit method will be described in detail.

3. Implicit/Explicit Signaling Method

When signaling the trigger information, an AP may use the Implicit Signaling method and the Explicit Signaling method described above in mixed manner. For example, when an STA receives a data field through a resource unit includes tones of more than 106-tone, the STA may perform a MU transmission of an ACK frame using the corresponding resource unit as it is (Implicit Signaling method). Or, when an STA receives a data field through a resource unit includes tones of less than 106-tone, the STA may perform a MU transmission of an ACK frame according to the trigger information carried on the corresponding data field or wait until a MU BAR frame is received (Explicit Signaling method).

As such, in the case that the Implicit Signaling method and the Explicit Signaling method are used in mixed manner, a separate indicator for indicating which signaling method is used may be required. For example, it may be assumed that when the trigger information is existed in a DL PPDU without any separate indicator, an ACK frame is transmitted in a MU manner according to the Explicit Signaling method, and when the trigger information is not existed in a DL PPDU, an ACK frame is transmitted in a MU transmission according to the Implicit Signaling method. In this case, when the reception of the MPDU including the trigger information is failed, an STA is unable to detect whether the trigger information is included in a DL PPDU, and thus, the STA may perform a MU transmission of an ACK frame according to the Implicit Signaling method. As a result, the corresponding ACK frame may collide with a MU ACK frame transmitted according to the trigger information from another STA.

Accordingly, an indicator is required for indicating which method is used among the Implicit or Explicit Signaling method as a signaling method of the trigger information. An embodiment of such an indicator will be described in detail below.

(1) Method of Reusing an ACK Policy Field

As an indicator for indicating a signaling method of the trigger information, the ACK policy field may be reused as follows.

Table 14 exemplifies ACK policy fields according to an embodiment of the present invention.

TABLE 14

| Bits in QoS Control field | | |
|---|---|---|
| Bit 5 | Bit 6 | Meaning |
| 0 | 0 | Explicit Signaling method In the case of a DL MU PPDU, the trigger information for Ack/BA signaling is existed in a DL PPDU. Accordingly, after SIFS, an ACK frame according to the trigger information is transmitted in a MU manner. |
| 1 | 0 | No Ack |
| 0 | 1 | Implicit Signaling method In the case that a received PPDU is a DL MU PPDU, an STA performs a MU transmission of an ACK frame according to the Implicit Signaling method. Or, when bit 6 of a Frame control field = '1', it is interpreted in the same way as in the existing system, and when the bit 6 = '0', an ACK frame is transmitted in a MU manner according to the Implicit Signaling method. |
| 1 | 1 | BA In the case of a DL MU PPDU, an STA anticipates that a MU BAR will be transmitted later, and waits for the MU BAR. |

Referring to Table 14, the case that the ACK policy field is '00' indicates the Explicit Signaling method and the case that the ACK policy field is '01' indicates the Implicit Signaling method. Accordingly, when the received ACK policy field is '00', an STA may perform a MU transmission of an ACK frame based on the trigger information (included in a MAC header or a trigger frame) received from an AP. When the received ACK policy field is '01', an STA may perform a MU transmission of an ACK frame according to the preconfigured method. When the received ACK policy field is '11', an STA anticipates that a MU BAR will be transmitted later and waits for the MU BAR frame, and may perform a MU transmission of an ACK frame based on the MU BAR frame that will be received later.

(2) Method of Inserting it in a Physical Preamble

The indicator for indicating the signaling method of the trigger information may be transmitted with being inserted in a physical preamble. For example, the indicator is inserted in a HE-SIG A field as the common information, and may indicate commonly the signaling method of the trigger information to all STAs that receive a DL MU PPDU. Or, the indicator may be inserted in a HE-SIG B field as the user individual information, and may indicate individually the signaling method of the trigger information to each of STAs. In addition, the indicator may be inserted as a Reserved bit of Delimiter of a DL PPDU.

FIG. 30 is a flowchart illustrating a UL MU transmission method of an STA device according to an embodiment of the present invention. The embodiments described above may be identically applied to the description in relation to the flowchart. Accordingly, the overlapped description will be omitted below.

Referring to FIG. 30, an STA may receive a DL MU PPDU (step, S3010). More particularly, the STA may receive a DL MU PPDU that includes a physical preamble and a data field from an AP. In this case, the data field includes at least one MPDU, and the at least one MPDU includes a trigger frame or a MAC header. The trigger frame or the MAC header includes the trigger information for a UL MU transmission of an ACK (Acknowledge) frame. In this case, in the trigger information, the frequency resource unit allocation information for an OFDMA transmission of an ACK frame and the length information of a UL MU PPDU including the ACK frame may be included.

Next, the STA may perform a UL MU transmission of the ACK frame as a response to the received DL MU PPDU based on the trigger information (step, S3020). In this case, when the ACK policy field of the received at least on MPDU is '01', the STA may perform a UL MU transmission of the ACK frame as an immediate response to the DL MU PPDU based on the trigger information included in the at least one MPDU. On the other hand, when the ACK policy field of all MPDUs (e.g., A-MPDU) in the data field is '01' and the reception of the at least one MPDU is failed, the STA may not perform step S3020. This is designed for preventing a collision with another MU ACK frame that may be generated according to performing a UL MU transmission of the ACK frame without the trigger information by the STA.

FIG. 31 is a block diagram of each STA device according to an embodiment of the present invention.

In FIG. 31, an STA device 3110 may include a memory 3112, a processor 3111 and an RF unit 3113. And, as described above, the STA device may be an AP or a non-AP STA as an HE STA device.

The RF unit 3113 may transmit/receive a radio signal with being connected to the processor 3111. The RF unit 3113 may transmit a signal by up-converting the data received from the processor 3111 to the transmission/reception band.

The processor 3111 may implement the physical layer and/or the MAC layer according to the IEEE 802.11 system with being connected to the RF unit 3113. The processor 3111 may be constructed to perform the operation according to the various embodiments of the present invention according to the drawings and description. In addition, the module for implementing the operation of the STA 3110 according to the various embodiments of the present invention described above may be stored in the memory 3112 and executed by the processor 3111.

The memory 3112 is connected to the processor 3111, and stores various types of information for executing the processor 3111. The memory 3112 may be included interior of the processor 3111 or installed exterior of the processor 3111, and may be connected with the processor 3111 by a well known means.

In addition, the STA device 3110 may include a single antenna or a multiple antenna.

The detailed construction of the STA device 3110 of FIG. 31 may be implemented such that the description of the various embodiments of the present invention is independently applied or two or more embodiments are simultaneously applied.

The embodiments described above are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention may be implemented through various means, for example, hardware, firmware, software, or a combination thereof. When implemented as hardware, one embodiment of the present invention may be carried out as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, one embodiment of the present invention may be carried out as a module, a procedure, or a function that performs the functions or operations described above. Software code may be stored in the memory and executed by the processor. The memory is located inside or outside the processor and may transmit and receive data to and from the processor via various known means.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein

MODE FOR INVENTION

The embodiments for carrying out the invention have been described in the best mode for invention.

INDUSTRIAL APPLICABILITY

While a frame transmission scheme in a wireless communication system according to the present invention has been described with respect to its application to an IEEE 802.11 system, it also may be applied to other various wireless communication systems than the IEE 802.11 system.

What is claimed is:

1. A method for performing a multi-user (MU) transmission of an access point (AP) in a Wireless LAN (WLAN) system, the method comprising:
   transmitting, to a station (STA), downlink (DL) Physical Protocol Data Unit (PPDU) including a MAC Protocol Data Unit (MPDU),
   wherein a MAC Header of the MPDU includes (i) a quality of service (QoS) control field and (ii) a High Efficiency (HE) control field,
   wherein the HE control field includes trigger information for an ACK frame that is response to the DL PPDU,
   wherein the trigger information includes at least one of frequency resource information for transmission of the ACK frame or length information of the DL PPDU,
   receiving, from the STA, UL PPDU based on the trigger information,
   wherein the UL PPDU includes the ACK frame based on a value of an ACK policy field of the QoS control field.

2. The method of claim 1,
   wherein the value of the ACK policy field is set to 01.

3. The method of claim 1,
   wherein the MPDU further includes at least one of information related to Modulation Coding Scheme (MCS), or information related to beamforming.

4. The method of claim 1,
   wherein transmission of the UL PPDU is performed after a Short Interframe Space (SIFS) from transmission of the DL PPDU.

5. The method of claim 1,
   wherein the HE control field is a High Throughput (HT) control field of which first and second bits are set to '1', respectively.

6. The method of claim 1,
   wherein the HE control field is used for determining a type of ACK frame,
   wherein the type of ACK frame is for single-user or multi-user.

7. An access point (AP) in a wireless LAN (WLAN) system, comprising:
   a transceiver configured to transmit and receive a wireless signal; and
   a processor configured to control the transceiver,
   wherein the processor is configured to:
   transmit, to a station (STA), downlink (DL) Physical Protocol Data Unit (PPDU) including a MAC Protocol Data Unit (MPDU),
   wherein a MAC Header of the MPDU includes (i) a quality of service (QoS) control field and (ii) a High Efficiency (HE) control field,
   wherein the HE control field includes trigger information for an ACK frame that is response to the DL PPDU,
   wherein the trigger information includes at least one of frequency resource information for transmission of the ACK frame or length information of the DL PPDU,
   receive, from the STA, UL PPDU based on the trigger information,
   wherein the UL PPDU includes the ACK frame based on a value of an ACK policy field of the QoS control field.

8. The AP of claim 7,
   wherein the value of the ACK policy field is set to 01.

9. The AP of claim 7,
wherein the MPDU further includes at least one of information related to Modulation Coding Scheme (MCS), or information related to beamforming.

10. The AP of claim 7,
wherein transmission of the UL PPDU is performed after a Short Interframe Space (SIFS) from transmission of the DL PPDU.

11. The AP of claim 7,
wherein the HE control field is a High Throughput (HT) control field of which first and second bits are set to '1', respectively.

12. The AP of claim 7,
wherein the HE control field is used for determining a type of ACK frame,
wherein the type of ACK frame is for single-user or multi-user.

13. A station (STA) in a wireless LAN (WLAN) system, comprising:
a transceiver configured to transmit and receive a wireless signal; and
a processor configured to control the transceiver,
wherein the processor is configured to:
receive, from an access point (AP), downlink (DL) Physical Protocol Data Unit (PPDU) including a MAC Protocol Data Unit (MPDU),
wherein a MAC Header of the MPDU includes (i) a quality of service (QoS) control field and (ii) a High Efficiency (HE) control field,
wherein the HE control field includes trigger information for an ACK frame that is response to the DL PPDU,
wherein the trigger information includes at least one of frequency resource information for transmission of the ACK frame or length information of the DL PPDU,
transmit, to the AP, UL PPDU based on the trigger information,
wherein the UL PPDU includes the ACK frame based on a value of an ACK policy field of the QoS control field.

14. The STA of claim 13,
wherein the value of the ACK policy field is set to 01.

15. The STA of claim 13,
wherein the MPDU further includes at least one of information related to Modulation Coding Scheme (MCS), or information related to beamforming.

16. The STA of claim 13,
wherein transmission of the UL PPDU is performed after a Short Interframe Space (SIFS) from transmission of the DL PPDU.

17. The STA of claim 13,
wherein the HE control field is a High Throughput (HT) control field of which first and second bits are set to '1', respectively.

18. The STA of claim 13,
wherein the HE control field is used for determining a type of ACK frame,
wherein the type of ACK frame is for single-user or multi-user.

* * * * *